United States Patent
Morita et al.

(10) Patent No.: US 10,823,848 B2
(45) Date of Patent: Nov. 3, 2020

(54) DETECTION APPARATUS, DETECTION METHOD, AND DETECTION PROGRAM

(71) Applicant: Panasonic Intellectual Property Management Co., Ltd., Osaka (JP)

(72) Inventors: Tadashi Morita, Kanagawa (JP); Masahiko Hashimoto, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 321 days.

(21) Appl. No.: 15/905,899

(22) Filed: Feb. 27, 2018

(65) Prior Publication Data

US 2018/0267167 A1 Sep. 20, 2018

(30) Foreign Application Priority Data

Mar. 16, 2017 (JP) .................. 2017-051687

(51) Int. Cl.
*G01S 15/04* (2006.01)
*G01S 15/50* (2006.01)
(Continued)

(52) U.S. Cl.
CPC .............. *G01S 15/04* (2013.01); *G01S 7/536* (2013.01); *G01S 15/325* (2013.01); *G01S 15/50* (2013.01);
(Continued)

(58) Field of Classification Search
CPC ...... G01S 15/931; G01S 7/536; G01S 15/325; G01S 7/53
See application file for complete search history.

(56) References Cited

U.S. PATENT DOCUMENTS 7,643,376 B2   1/2010  Matsuura et al.
9,128,182 B2 *  9/2015  Kishigami .............. G01S 7/288
(Continued)

FOREIGN PATENT DOCUMENTS

DE   102010033384 A1   2/2012
DE   102011086397 A1   5/2012
(Continued)

OTHER PUBLICATIONS

Extended European Search Report, dated Jul. 25, 2018, for the related European Patent Application No. 18159616.4.

*Primary Examiner* — Mischita L Henson
(74) *Attorney, Agent, or Firm* — Seed IP Law Group LLP

(57) ABSTRACT

A detection apparatus that includes correlation processing systems that each find a correlation between a predetermined code sequence and a wave detection signal obtained by detecting a phase-modulated input wave at a frequency different from a frequency used by a different one of the correlation processing systems, and thereby generate a correlation signal, level reduction processors that each receive the correlation signal from a corresponding one of the plurality of correlation processing systems and reduce a level of the received correlation signal when the correlation signal is not to be used for detection of the target or do not reduce the level of the received correlation signal when the correlation signal is to be used for detection of the target, and a detector that detects at least presence or absence of the target based on the correlation signal processed by each of the plurality of level reduction processors.

8 Claims, 22 Drawing Sheets

(51) Int. Cl.
*G01S 15/32* (2006.01)
*G01S 15/931* (2020.01)
*G01S 7/536* (2006.01)
*G01S 7/534* (2006.01)
*G01S 7/53* (2006.01)

(52) U.S. Cl.
CPC ............... *G01S 15/931* (2013.01); *G01S 7/53* (2013.01); *G01S 7/534* (2013.01)

(56) References Cited

U.S. PATENT DOCUMENTS

| | | |
|---|---|---|
| 2012/0120768 A1 | 5/2012 | Horsky et al. |
| 2012/0176864 A1 | 7/2012 | Karl |
| 2017/0003391 A1 | 1/2017 | Hallek et al. |

FOREIGN PATENT DOCUMENTS

| | | |
|---|---|---|
| DE | 102013021845 A1 | 6/2015 |
| JP | 2012-533741 | 12/2012 |

\* cited by examiner

FIG. 21
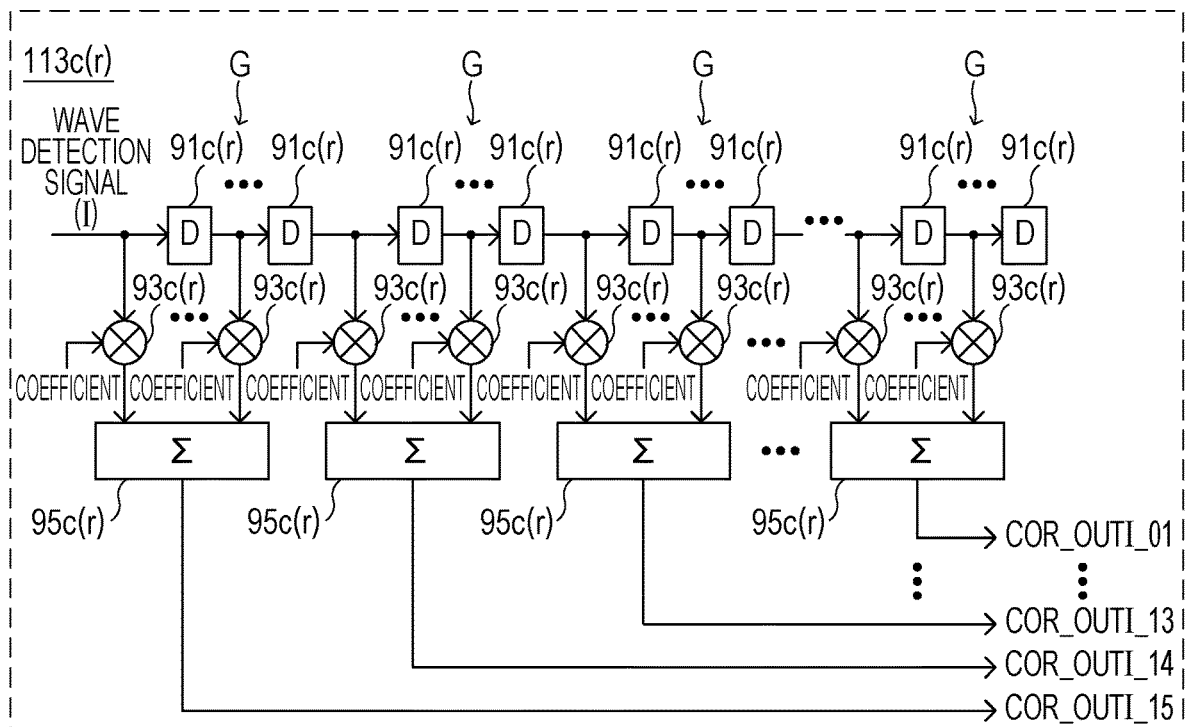
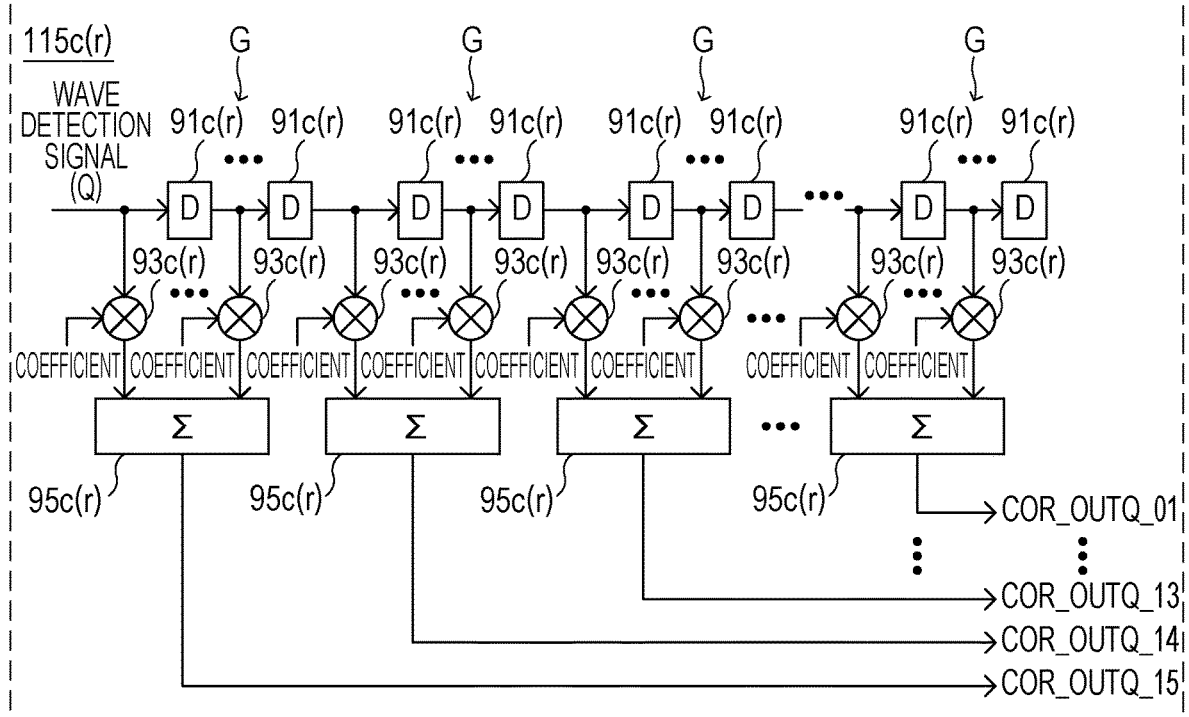

DETECTION APPARATUS, DETECTION METHOD, AND DETECTION PROGRAM

BACKGROUND

1. Technical Field

The present disclosure relates to a detection apparatus, a detection method, and a detection program that detect an object (or a target) present in a vicinity.

2. Description of the Related Art

There is a conventional detection apparatus that, for example, transmits a pulse signal coded with a predetermined code sequence so as not to detect an object using a pulse signal sent from a different detection apparatus. Such a detection apparatus finds a correlation between the code sequence used by the detection apparatus itself and a wave detection signal obtained by reception and detection of a returned wave from a target. After finding the correlation, the detection apparatus obtains, for example, the distance to the target.

In a sonar system as an example of a detection apparatus, target velocity is higher than carrier velocity. In such a detection apparatus, the phase of a reception signal rotates due to the Doppler shift. Thus, the detection apparatus includes a plurality of correlators supporting different target velocities, and obtains for example the distance to the target using correlation outputs from these correlators. Related techniques are disclosed in, for example, Japanese Unexamined Patent Application Publication (Translation of PCT Application) No. 2012-533741.

SUMMARY

In a conventional detection apparatus, however, the accuracy of a detection result may be affected by a correlation output from a correlator not supporting the actual target velocity.

One non-limiting and exemplary embodiment facilitates providing a detection apparatus, a detection method, and a detection program capable of detecting a target with higher accuracy.

In one general aspect, the techniques disclosed here feature a detection apparatus that includes: a plurality of correlation processing systems that each find a correlation between a predetermined code sequence and a wave detection signal obtained by detecting a phase-modulated input wave at a frequency different from a frequency used by a different one of the correlation processing systems, and thereby generate a correlation signal; a plurality of level reduction processors that each receive the correlation signal from a corresponding one of the plurality of correlation processing systems and reduce a level of the received correlation signal when the correlation signal is not to be used for detection of the target or do not reduce the level of the received correlation signal when the correlation signal is to be used for detection of the target; and a detector that detects at least presence or absence of the target based on the correlation signal processed by each of the plurality of level reduction processors.

The present disclosure facilitates providing a detection apparatus, a detection method, and a detection program capable of detecting a target with higher accuracy.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 21 is a diagram illustrating correlators (I) and (Q) in FIG. 20; and

DETAILED DESCRIPTION

1. Detection Apparatus 1e According to a Comparative Example

First, a detection apparatus 1e according to a comparative example is described with reference to FIG. 1.

Figure 1:
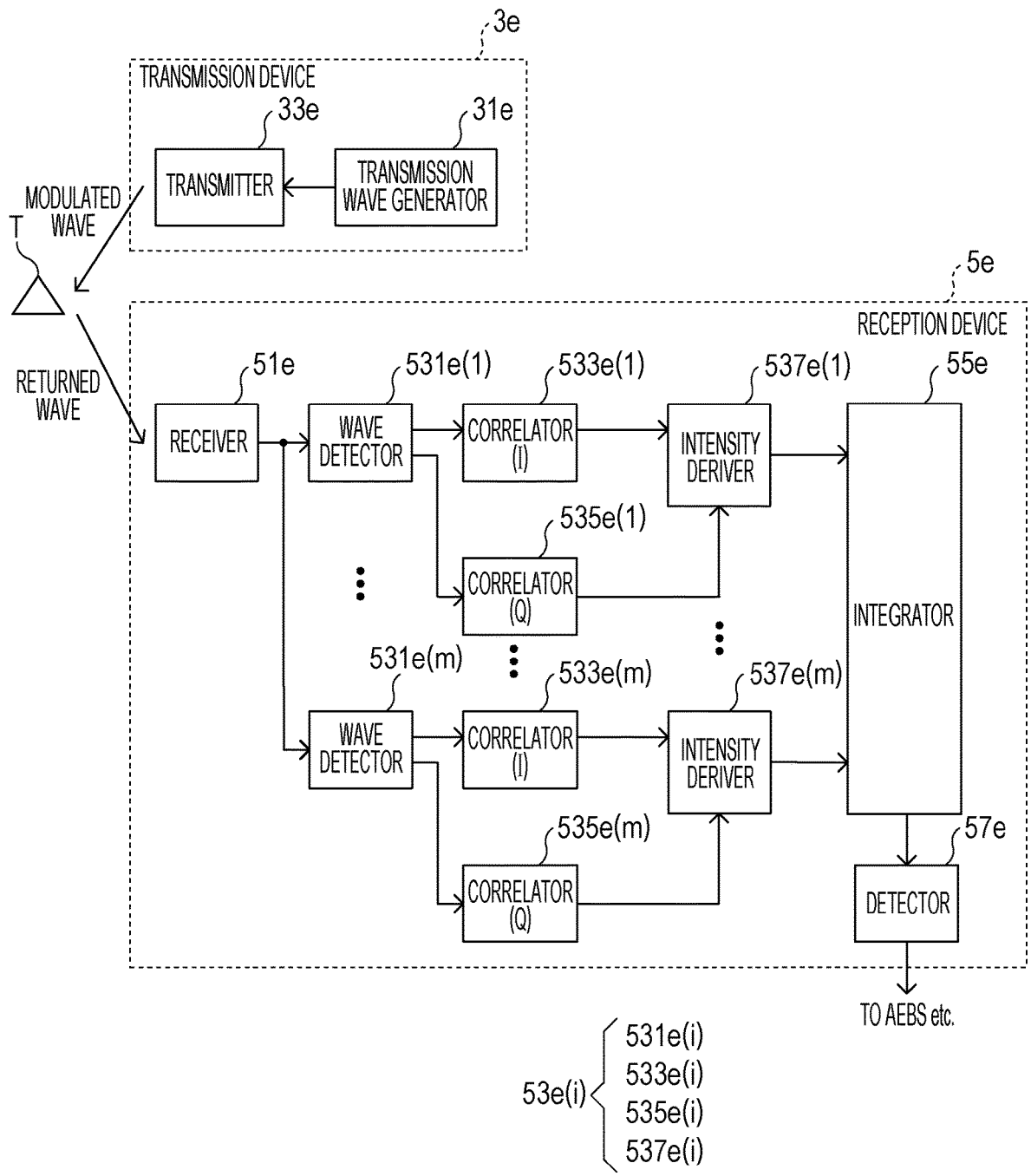
FIG. 1 is a block diagram illustrating the configuration of a detection apparatus according to a comparative example.

In FIG. 1, the detection apparatus 1e includes a transmission device 3e and a reception device 5e.

The transmission device 3e includes a transmission wave generator 31e and a transmitter 33e.

The reception device 5e includes a receiver 51e, m correlation processing systems 53e(i), an integrator 55e, and a detector 57e. Each correlation processing system 53e(i) includes a wave detector 531e(i), a correlator (I) 533e(i), a correlator (Q) 535e(i), and an intensity deriver 537e(i).

In the above, "m" is an integer greater than or equal to two and is for example 41, and "i" is an integer from 1 to m.

In the transmission device 3e, the transmission wave generator 31e uses a known code sequence and a predetermined coding method (a predetermined digital modulation method) to modulate a carrier wave having a frequency fc. A modulated wave is thus generated.

Figure 2:
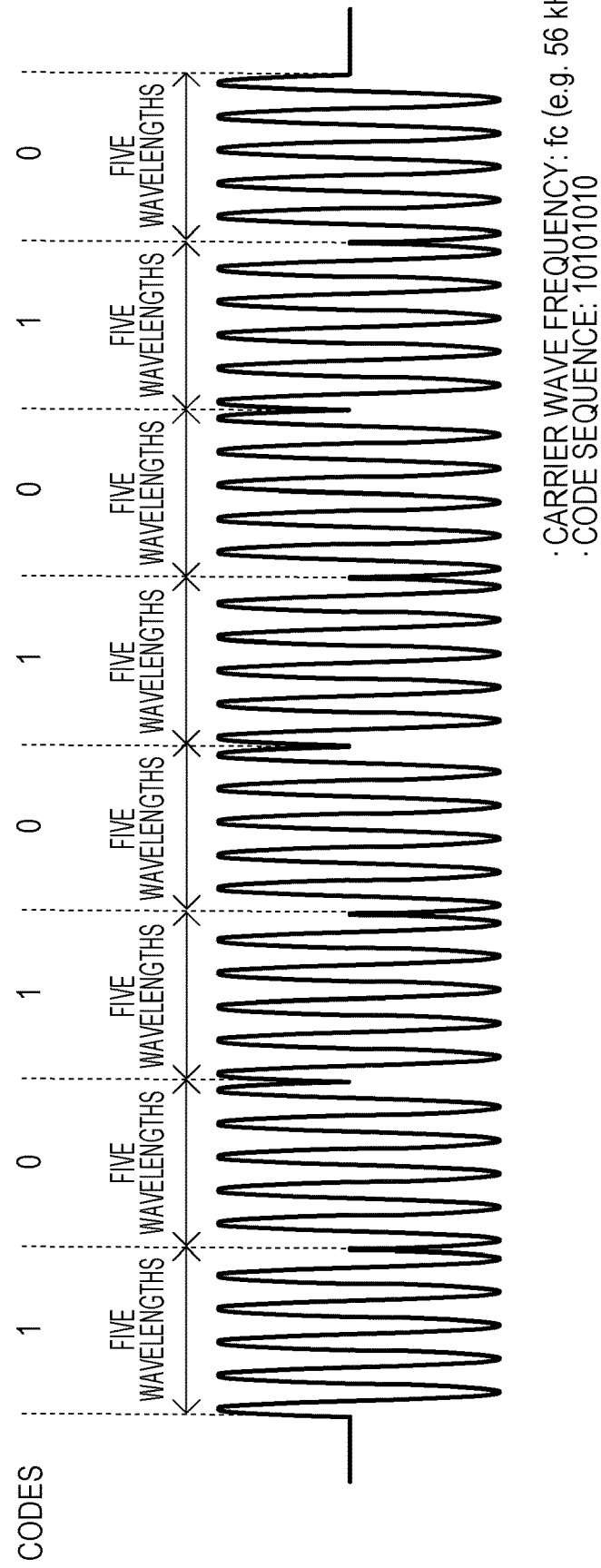
FIG. 2 is a schematic diagram illustrating a modulated wave emitted from a transmission device in FIG. 1.

With reference to FIG. 2, a description is now given of an example of how the transmission wave generator 31e modulates a carrier wave.

In FIG. 2, the carrier wave frequency fc is set to, for example, 56 kHz when the detection apparatus 1e is a sonar apparatus.

The predetermined coding method is, for example, phase shift keying such as binary phase shift keying (BPSK). In BPSK, the phase of a carrier wave is changed to either 0° or 180° after every predetermined number of wavelengths. An example of the predetermined number is five. If a code "0" is assigned to the phase 0°, a code "1" is assigned to the phase 180°.

Further, a known code sequence is defined beforehand as, for example, "1, 0, 1, 0, 1, 0, 1, 0".

Referring back to FIG. 1, the transmission wave generator 31e outputs the modulated wave to the transmitter 33e. The transmitter 33e performs amplification and the like on the input modulated wave, and then emits the resultant wave to an outer space. The modulated wave may be a pulse wave or a continuous wave.

If a target T is present in the field of view of the detection apparatus 1e, the modulated wave thus emitted is reflected by the target T. Part of the reflected wave is received by the reception device 5e as a returned wave.

In the reception device 5e, the receiver 51e receives an input wave, performs amplification and the like on the wave, and outputs the wave to each wave detector 531e(i). Note that the input wave may be either the returned wave described above or any other unnecessary wave (interference).

Figure 3:
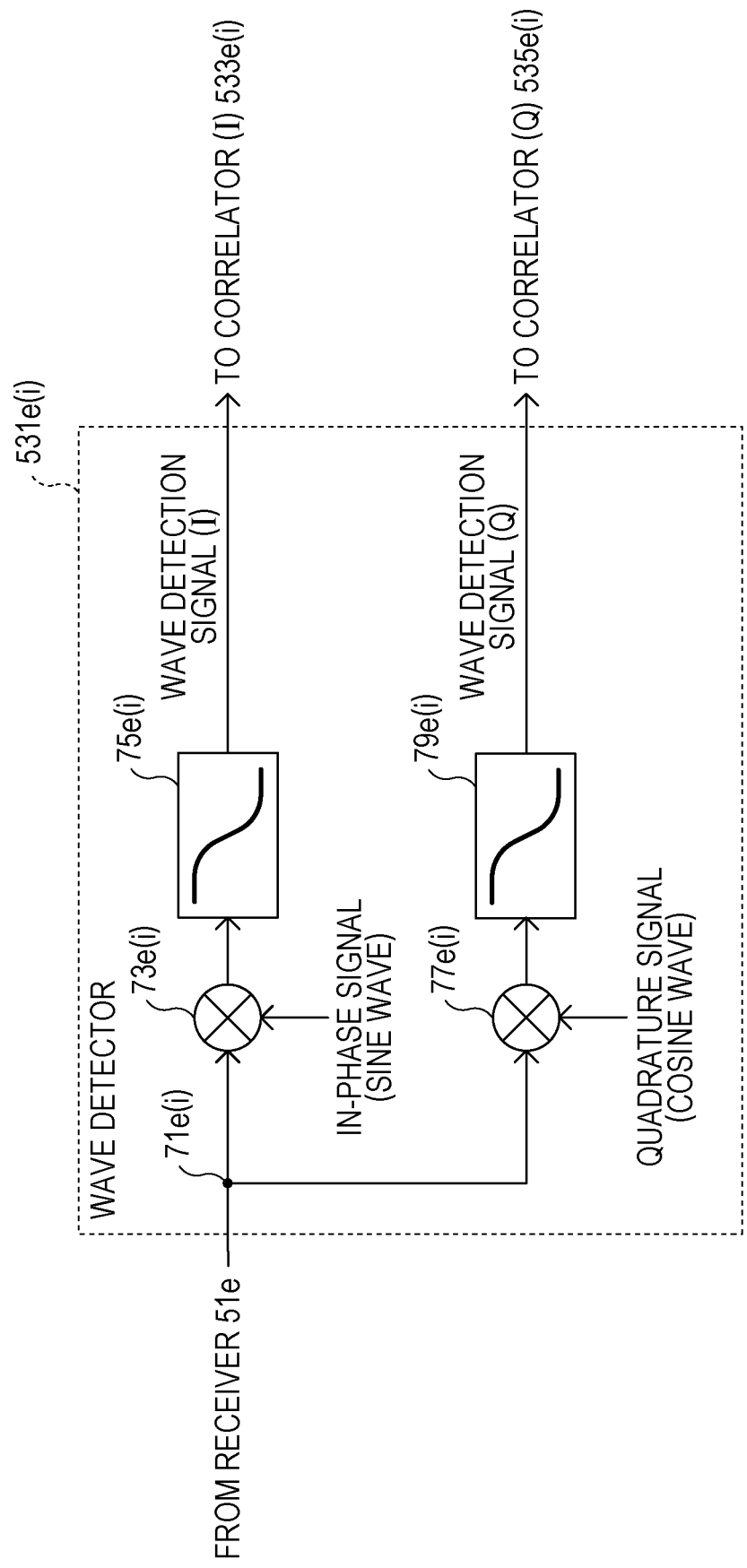
FIG. 3 is a diagram illustrating the configuration of a wave detector in FIG. 1.

To perform quadrature detection on the wave outputted from the receiver 51e, each wave detector 531e(i) includes, as illustrated in FIG. 3, a bifurcator 71e(i), a mixer (I) 73e(i), an LPF (I) 75e(i), a mixer (Q) 77e(i), and an LPF (Q) 79e(i).

The bifurcator 71e(i) receives the wave outputted from the receiver 51e. The bifurcator 71e(i) bifurcates the input wave into two parts and outputs one to the mixer (I) 73e(i) and the other to the mixer (Q) 77e(i).

The mixer (I) 73e(i) receives not only the wave outputted from the bifurcator 71e(i), but also an in-phase signal (e.g., a sine wave) which has the frequency fc (i) and is in phase with a carrier wave. The mixer (I) 73e(i) performs frequency mixing on the wave and the in-phase signal inputted thereto, and outputs the result to the following LPF (I) 75e(i).

The frequency fc (i) is different for each wave detector 531e(i), and is determined according to the relative velocity of the detection target T with respect to the detection apparatus 1e.

The LPF (I) 75e(i) removes high-frequency (e.g., 2×fc) components from the input signal from the mixer (I) 73e(i) and generates a wave detection signal (I). The frequency of the wave detection signal (I) is the difference between the frequency of the in-phase signal and the frequency of the wave inputted to the receiver 51e. The wave detection signal (I) is inputted to the correlator (I) 533e(i).

The mixer (Q) 77e(i) receives not only the wave outputted from the bifurcator 71e(i), but also a quadrature signal (e.g., a cosine wave) which is out of phase with the in-phase signal by 90°. The mixer (Q) 77e(i) performs frequency mixing on the wave and the quadrature signal inputted thereto, and outputs the resultant signal to the following LPF (Q) 79e(i).

The LPF (Q) 79e(i) removes a high-frequency component from the signal inputted from the mixer (Q) 77e(i) and generates a wave detection signal (Q). The wave detection signal (Q) generated by the LPF (Q) 79e(i) is inputted to the following correlator (Q) 535e(i).

Referring back to FIG. 1, each correlator (I) 533e(i), which is a what is called a matched filter, finds a correlation between the wave detection signal (I) outputted from the wave detector 531e(i) and the known code sequence, and generates a correlation signal (I) indicating the degree of correlation between them.

Figure 4:
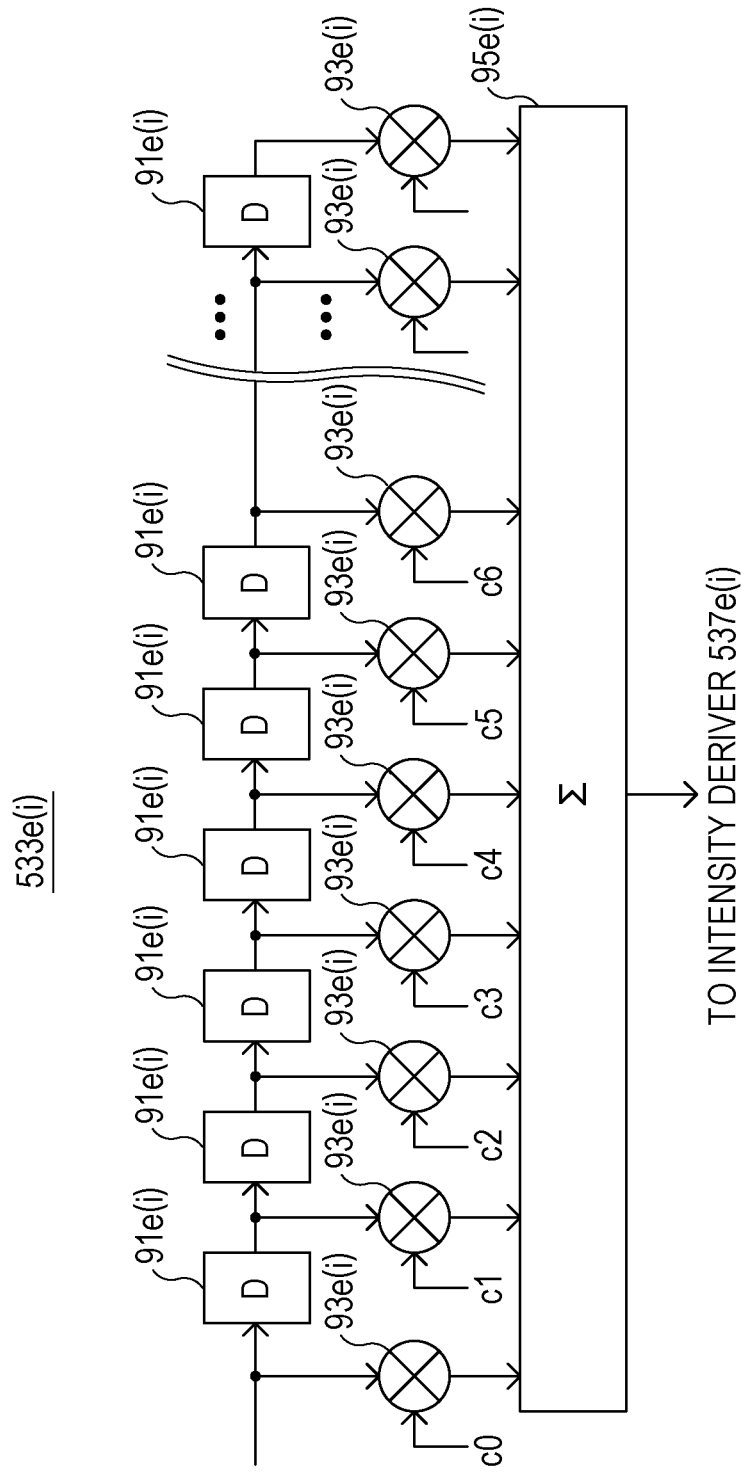
FIG. 4 is a diagram illustrating the configuration of each correlator in FIG. 1.

For the above processing, each correlator (I) 533e(i) includes, as illustrated in FIG. 4, a plurality of delayers 91e(i), a plurality of multipliers 93e(i), and one adder 95e(i), and finds a correlation between the wave detection signal (I) from the wave detector 531e(i) and the above-described code sequence at sampling intervals (in other words, in response to clock signals).

Coefficients used in the multipliers 93e(i) are determined based on the codes constituting the known code sequence. In a case where the code sequence is "1, 0, 1, 0, 1, 0, 1, 0" as illustrated in FIG. 2, if the code "0" is replaced by "−1", the modulated wave from the transmitter 33e has a code sequence "1, −1, 1, −1, 1, −1, 1, −1" superimposed thereon. Thus, the coefficients used in the multipliers 93e(i) are "1, −1, 1, −1, 1, −1, 1, −1".

The number of taps to assign to one code is determined based on the modulated wave emitted from the transmitter 33e and the sampling rate in the correlator (I) 533e(i). When one code is assigned to every five wavelengths of the modulated wave as illustrated in FIG. 2, the number of taps is determined based on the number of times sampling is performed over a time period required to receive the five wavelengths. The multipliers 93e(i) as taps for each code are assigned corresponding coefficients.

Next, an example is given of the coefficients set for the multipliers 93e(i).

In an example where sampling is performed five times within a time required for receiving a five wavelengths long part of a modulated wave, five taps are assigned to each code. In this case, the coefficients of the multipliers 93e(i) are as shown in Table 1 below.

TABLE 1

| Coefficients of multipliers 93e(i) | |
|---|---|
| coefficient | value |
| c0 | +1 |
| c1 | +1 |
| c2 | +1 |
| c3 | +1 |
| c4 | +1 |
| c5 | −1 |
| c6 | −1 |
| c7 | −1 |
| c8 | −1 |
| c9 | −1 |
| c10 | +1 |
| c11 | +1 |
| . | . |
| . | . |
| . | . |

Note that in Table 1 above, the coefficient c0 is the coefficient for the multiplier $93e(i)$ closest to the input end of the correlator (I) $533e(i)$. The coefficient c1 is the coefficient for the multiplier $93e(i)$ which is the second closest to the input end. Likewise, the coefficient cj is the coefficient for the (j+1)-th closest to the input end, where j is an integer.

At sampling intervals, each multiplier $93e(i)$ multiplies the wave detection signal (I) inputted from the preceding delayer $91e(i)$ by its own coefficient and generates a multiplication signal. The multiplier $93e(i)$ outputs the generated multiplication signal to the adder $95e(i)$.

The adder $95e(i)$ adds the outputs from all the multipliers $93e(i)$ and generates a correlation signal (I) indicating the degree of correlation between the wave detection signal (I) and the known code sequence. The adder $95e(i)$ outputs the generated correlation signal (I) to the intensity deriver $537e(i)$.

If the wave (returned wave) inputted to the reception device 5e is a signal which is identical to the modulated wave from the transmission device 3e (except for the signal intensity), the correlator (I) $533e(i)$ obtains correlation gain, and therefore the correlation signal (I) has a sharp correlation peak of a level higher than or equal to a threshold level. Conversely, if the correlator (I) $533e(i)$ finds a correlation with the timing being off or finds a correlation using a wave detection signal (I) having a different code sequence superimposed thereon, no high correlation peak appears in the correlation signal (I).

Note that descriptions of the correlator (Q) $535e(i)$ are not given for parts having the same configuration, as illustrated in FIG. 4.

Referring back to FIG. 1, at the sampling intervals, the intensity deriver $537e(i)$ calculates based on the correlation signals (I) and (Q) an absolute value in a quadrature space (which is a phase plane having an in-phase component of the phase as the I axis (a real number) and a quadrature component thereof as the Q axis (an imaginary number)) as a correlation signal and outputs the correlation signal to the following integrator 55e.

At the sampling intervals, the integrator 55e receives correlation signals from the m correlation processing systems $53e(i)$, selects a correlation signal with a largest value among the correlation signals thus received, and outputs the selected correlation signal to the detector 57e.

At the sampling intervals, the detector 57e determines whether the correlation signal from the integrator 55e exceeds a predetermined threshold. If the correlation signal from the integrator 55e exceeds the predetermined threshold, the detector 57e considers the input wave to the receiver 51e as a returned wave from a target T, and determines that there is a target T in the field of view of the detection apparatus 1e. Conversely, if the correlation signal from the integrator 55e does not exceed the predetermined threshold, the detector 57e determines that there is no target T in the field of view of the detection apparatus 1e.

The detection apparatus 1e detects the presence or absence of a target T in this manner.

The determination result obtained by the detector 57e is outputted to, for example, the advanced emergency braking system (AEBS) installed in a host vehicle (a subject vehicle). In this case, based on the determination result received, the AEBS may cause an indication of the presence of the target T to be displayed on a display device in the vehicle or to be outputted audibly from an audio output device. Further, the AEBS may automatically activate the brake of the vehicle if necessary.

2. Doppler Shift

When the target T is moving relative to the detection apparatus 1e, the frequency of the returned wave received by the reception device 5e is different from that of the modulated wave from the transmission device 3e due to the Doppler effect.

For example, when the target T is moving toward the reception device 5e, the returned wave has a higher frequency than the modulated wave due to the Doppler effect. In other words, the returned wave has a shorter wavelength than the modulated wave.

Conversely, when the target T is moving away from the reception device 5e, the returned wave has a lower frequency than the modulated wave.

If the detection apparatus 1e is a sonar apparatus, the carrier wave is a sonar wave. The speed of sound in space is approximately 340 m/s. Assuming that the target T is a different vehicle (an object vehicle) travelling at 10 km/h (approximately 2.8 m/s), the ratio of the moving velocity of the target to the propagation speed of a carrier wave in space is a little under 1%.

When the carrier wave frequency fc is, as described above, 56 kHz and the moving velocity of the target T is 10 km/h, the frequency of the returned wave is derived by the following Formulae (1) and (2):

1. When the target T is moving toward the reception device 5e:

$$56 \times \frac{340 + 2.8}{340 - 2.8} = 56.93 \text{ (kHz)} \qquad (1)$$

2. When the target T is moving away from the reception device 5e:

$$56 \times \frac{340 - 2.8}{340 + 2.8} = 55.09 \text{ (kHz)} \qquad (2)$$

Even if the ratio of the moving velocity of the target to the propagation speed of a carrier wave in space is a little under 1% as mentioned above, the frequency of the returned wave fluctuates on the order of ±1 kHz relative to the carrier frequency fc.

In the detection apparatus 1e, as described above, each mixer (I) $73e(i)$ uses a different frequency, and each mixer (Q) 77e(i) uses a different frequency as well. Thus, any of the mixers (I) 73e(i) may generate a wave detection signal (I) by performing frequency mixing on an input wave whose frequency has changed due to the Doppler shift and the in-shift signal having a frequency the same as or approximate to the input wave. In this case, the correlator (I) 533e(i) following the mixer (I) 73e(i) finds a correlation between the wave detection signal (I) and the known code sequence, and therefore outputs a correlation signal (I) having a large correlation peak. This also applies to the correlator (Q) 535e(i).

For example, if the carrier wave frequency fc is 56 kHz, the correlation processing system 53e(i) using 56 kHz detects the target T whose Doppler velocity is 0 km/h.

Further, in order to detect a returned wave from a target T moving toward the reception device 5e at 10 km/h, the correlation processing system 53e(i) needs to use 56.93 kHz.

Assume that the detection apparatus 1e is a sonar apparatus capable of detecting a target T at 1-km/h intervals in the range of ±20 km/h of the moving velocity of the host vehicle (the subject vehicle). In this case, it is necessary to set m to 41 and to appropriately select the carrier wave frequencies used by the mixers (I) 73e(i) and the mixers (Q) 77e(i).

3. Summary of the Detection Apparatus 1e

If the relative velocity of the target T is 0 km/h, one of the correlation processing systems 53e(i) outputs a correlation signal having a large peak as a main-lobe component. Meanwhile, a different one of the correlation processing systems 53e(i) outputs a correlation signal having a small peak as a side-lobe component.

Figure 5:
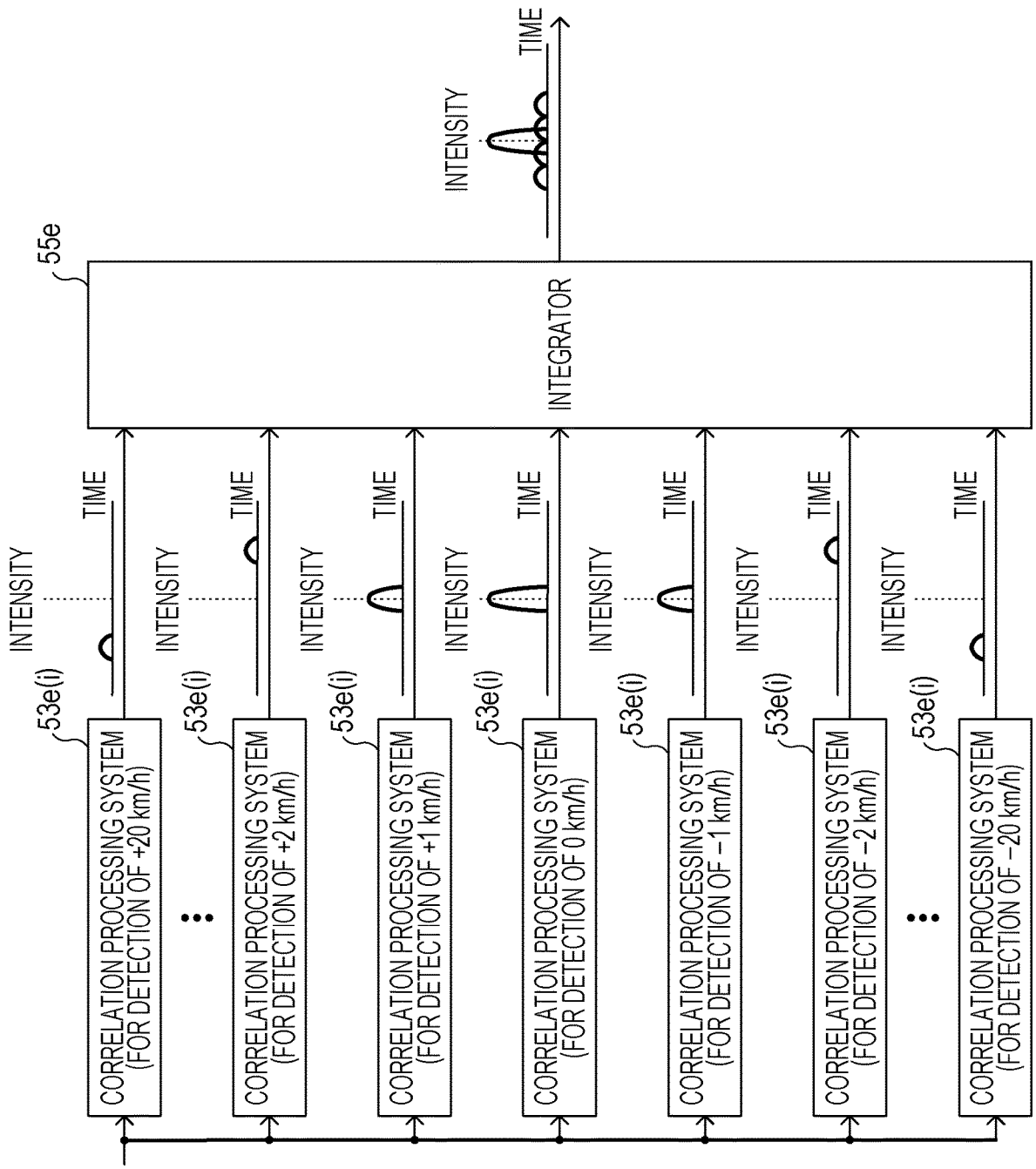
FIG. 5 is a diagram illustrating part of the configuration of the detection apparatus in FIG. 1.

For example, as illustrated in FIG. 5, at the same timing when a certain one of the correlation processing systems 53e(i) outputs a correlation signal with a large peak, the correlation processing systems 53e(i) which are assigned relative velocities in the immediate vicinity of 0 km/h output correlation signals with a small peak as side-lobe components.

In addition, as illustrated in FIG. 5, at a timing shifted from the output timing of the main-lobe component, the other correlation processing systems 53e(i) output correlation signals with an even smaller peak as side-lobe components.

In the detection apparatus 1e, the side-lobe components are outputted to the integrator 55e as well. Thus, if there is a target T with a large reflectivity (hereinafter called a second target T2) very close to another target T with a small reflectivity (hereinafter called a first target T1), the first target T1 may not be accurately detectable due to the side-lobe components produced by the detection of the second target T2.

Descriptions are now given of detection apparatuses 1a to 1c according to embodiments of the present disclosure which take the above points into consideration.

4. First Embodiment

First, the detection apparatus 1a according to a first embodiment is described with reference to FIGS. 6 and 7.

4-1. Configuration of and Processing Performed by the Detection Apparatus 1a The detection apparatus 1a in FIG. 6 differs from the detection apparatus 1e described earlier in including a reception device 5a in place of the reception device 5e.

The reception device 5a differs from the reception device 5e in further including level reduction processors 11a(i) following the respective correlation processing systems 53e(i).

Figure 6:
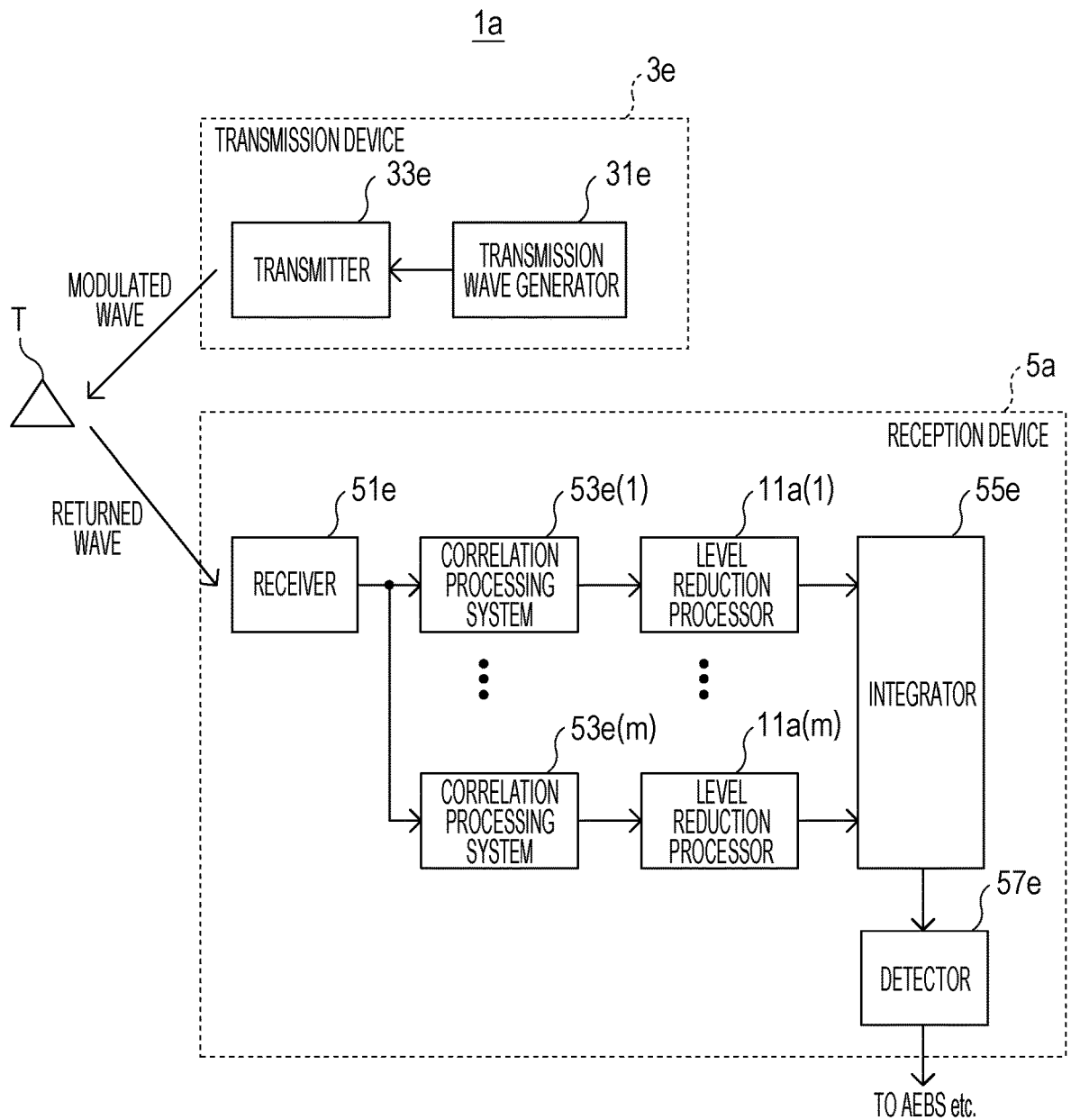
FIG. 6 is a block diagram illustrating the configuration of a detection apparatus according to a first embodiment of the present disclosure.

Components in FIG. 6 corresponding to those illustrated in FIG. 1 are denoted by the same reference signs and are not described again.

At the sampling intervals, each level reduction processor 11a(i) receives a correlation signal from the preceding intensity deriver 537e(i) and determines whether or not the correlation signal received is larger than or equal to a predetermined threshold. The predetermined threshold is a reference value for determining whether the correlation signal is a main-lobe component or a side-lobe component, and is determined by experiment, simulation, or the like in the development stage of the detection apparatus 1a.

When the correlation signal received is determined as being larger than or equal to the predetermined threshold, the level reduction processor 11a(i) determines that the received correlation signal is a main-lobe component and is to be used for the detection of the target T in the following detector 57e, and outputs the received correlation signal to the integrator 55e.

When the correlation signal received is determined as being smaller than the predetermined threshold, the level reduction processor 11a(i) determines that the received correlation signal is a side-lobe component and is not to be used for the detection of the target T, and sets the level of the received correlation signal to zero. In other words, the received correlation signal is masked and nullified.

4-2. Advantageous Effects Provided by the Detection Apparatus 1a

Figure 7:
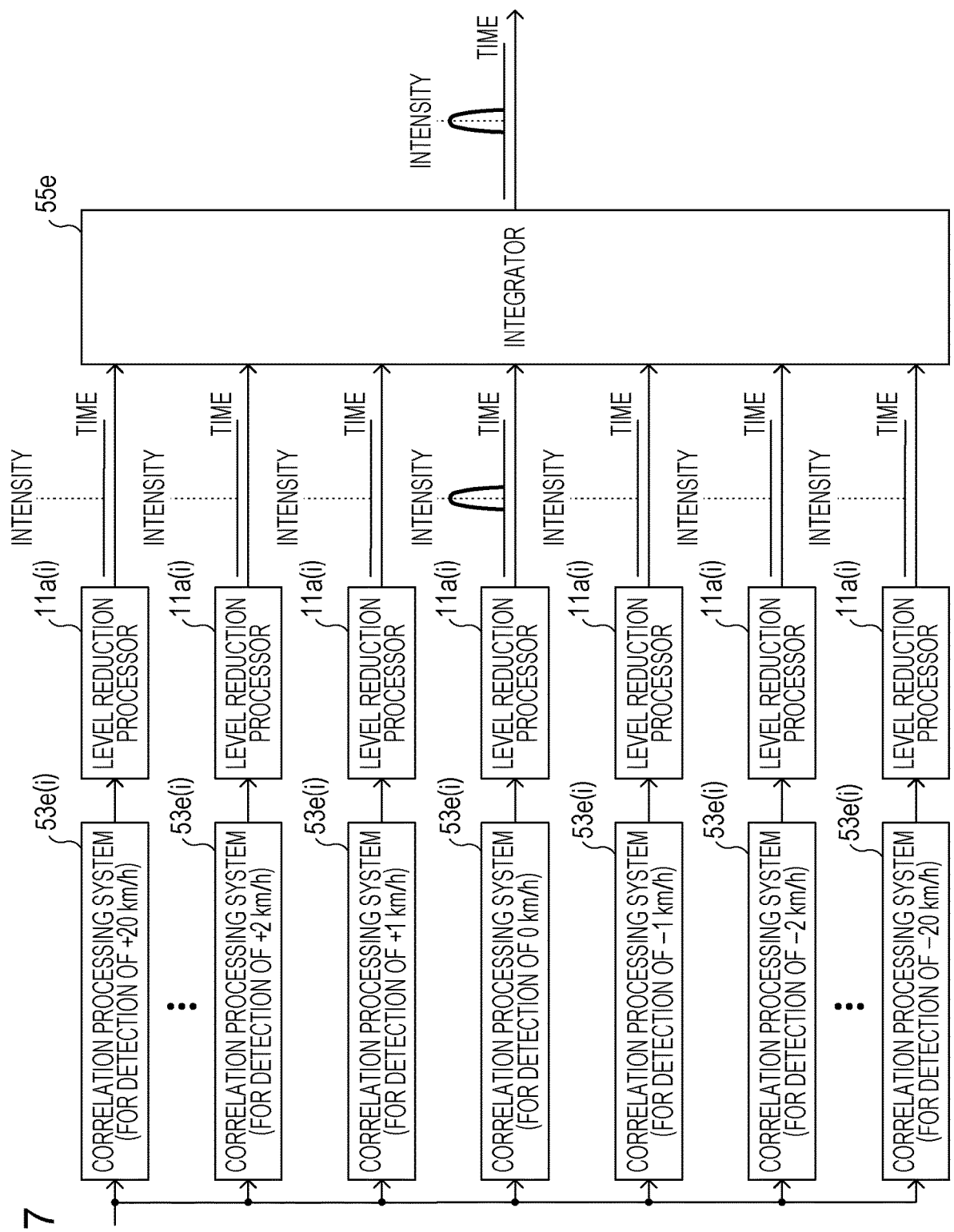
FIG. 7 is a diagram illustrating technical effects of the detection apparatus in FIG. 6.
Figure 8:
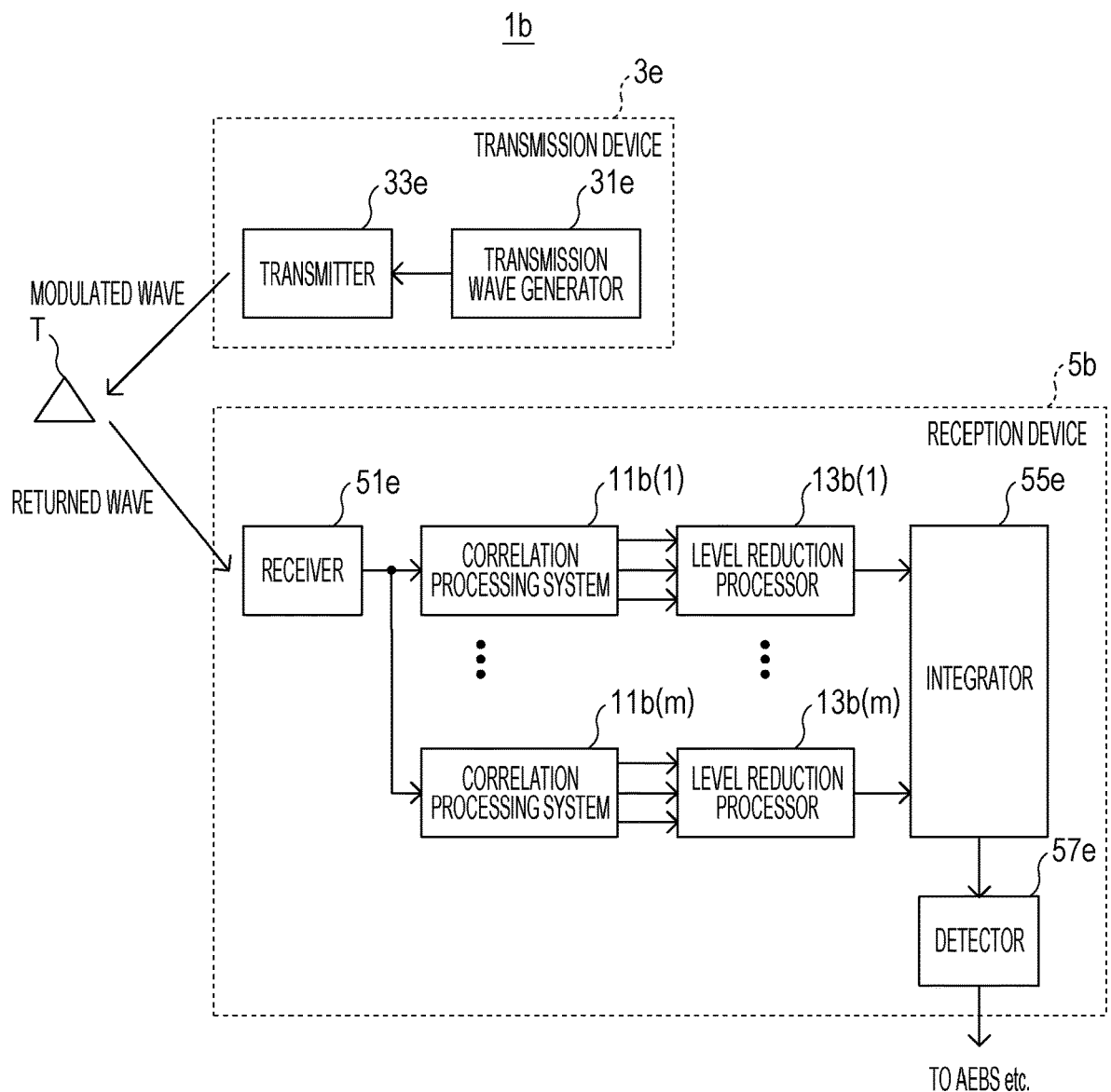
FIG. 8 is a block diagram illustrating the configuration of a detection apparatus according to a second embodiment of the present disclosure.

Since the detection apparatus 1a thus includes the level reduction processors 11a(i), side-lobe components are not sent to the integrator 55e as illustrated in FIG. 7. Thus, in a case where there is a second target having a large reflectivity near a first target having a small reflectivity for example, the detection apparatus 1a reduces the possibility of not being able to detect the first target accurately due to the side-lobe components produced by the detection of the second target even if their relative velocities are different from each other. In other words, the detection apparatus 1a is capable of more accurate target detection than the detection apparatus 1e. Note that FIG. 7 illustrates an example where the correlation processing systems 53e(i) for the relative velocity of 0 km/h outputs a main-lobe component just for the purpose of illustration.

4-3. Additional Notes on the First Embodiment

In the description given in section 4-1, a correlation signal is outputted to the integrator 55e if it is larger than or equal to the predetermined threshold, or otherwise, the correlation signal is outputted after being masked. However, the present disclosure is not limited to this. The level reduction processor 11a(i) may multiply the received correlation signal by a coefficient indicating that the correlation signal may be a main-lobe component, and then output the resultant correlation signal to the integrator 55e. As the coefficient, for example, 1.0 is multiplied if the possibility of the correlation signal being a main-lobe component is high, 0.5 is multiplied if the possibility is intermediate, and 0 is multiplied if the possibility is low.

Further, in the present disclosure, for example, the receiver 51e and the wave detector 531e(i) in the reception device 5a may be collectively called a front end. The front end is implemented by, for example, being integrated on a single-chip radio frequency integrated circuit (RFIC).

Meanwhile, the components in the reception device 5a other than the front end may be collectively called a back end. The back end is incorporated in, for example, a single-chip digital signal processor (DPS).

Although the present disclosure describes the carrier wave as a sound wave, the present disclosure is not limited to this. The carrier wave may be a radio wave or light. This also applies to first and second alternative examples given below.

Further, the present disclosure takes BPSK as an example of the coding method, but is not limited to this. PSK such as quadrature phase shift keying (QPSK) may be employed as the coding method instead.

Further, the present disclosure states that each correlation processing system 53$e(i)$ performs quadrature detection, but is not limited to this. Each correlation processing systems 53$e(i)$ may perform synchronous detection (phase detection). In this case, the correlators (Q) 535$e(i)$ may be omitted.

Moreover, in the detection apparatus 1a, the correlator (I) 533$e(i)$, the correlator (Q) 535$e(i)$, the intensity deriver 537$e(i)$, the level reduction processor 11$a(i)$, the integrator 55e, and the detector 57e may be implemented by a computer program. The computer program may be stored in a distributable medium such as a DVD and provided, or may be stored in a server apparatus on a network so that the computer program can be downloaded via the network.

The additional notes described above also apply to the second and third embodiments.

4-4. Alternative Example 1 of the Level Reduction Processing

When a correlation signal from a given correlation processing system 53$e(i)$ is a main-lobe component, the temporal change in the level of the correlation signal is as follows. The level of the correlation signal drastically increases when the moving velocity of the target T substantially matches the moving velocity assigned to the correlation processing systems 53$e(i)$, and keeps the large value as long as the velocities substantially match each other. Then, once the moving velocity of the target T no longer matches the moving velocity of the correlation processing systems 53$e(i)$, the level of the correlation signal drastically decreases.

Taking such a temporal change into account, the level reduction processor 11$a(i)$, upon receipt of a correlation signal from the intensity deriver 537$e(i)$, obtains an amount of change in the level of the correlation signal (i.e., a differential value) within a sampling period for example, and holds the thus-obtained differential values for the past predetermined period of time.

The level reduction processor 11$a(i)$ determines whether the length of time in which the correlation value between the temporal change in the differential values held by the level reduction processor 11$a(i)$ and a pattern of change in the above-described main-lobe component exceeds a certain threshold is longer than a reference value. The level reduction processor 11$a(i)$ outputs the received correlation signal to the integrator 55e if the length of time in which the correlation value exceeds the certain threshold is longer than the reference value, or otherwise, outputs the received correlation signal to the integrator 55e after masking the correlation signal.

The level reduction processor 11$a(i)$ thus configured can also produce the advantageous effects described in section 4-2.

5. Second Embodiment

Next, the detection apparatus 1b according to a second embodiment is described with reference to FIGS. 8 to 12.

5-1. Configuration of and Processing Performed by the Detection Apparatus 1b The detection apparatus 1b in FIG. 8 differs from the detection apparatus 1a in FIG. 6 in including a reception device 5b in place of the reception device 5a.

The reception device 5b differs from the reception device 5a in including combinations of a correlation processing system 11$b(i)$ and a level reduction processor 13$b(i)$ in place of combinations of the correlation processing system 53$e(i)$ and the level reduction processor 11$a(i)$.

Components in the present embodiment corresponding to those in the first embodiment are denoted by the same reference signs and are not described again, The length of a known code sequence (called a code sequence length hereinbelow) is denoted by N.

Figure 9:
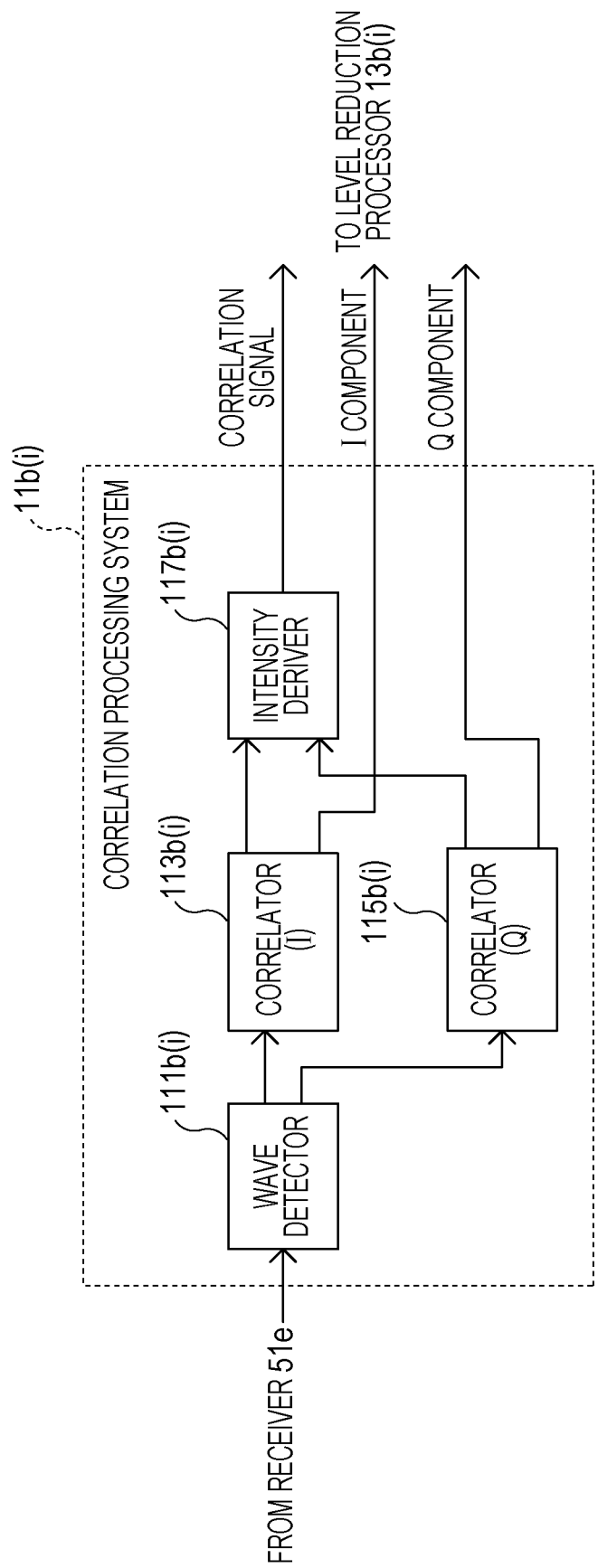
FIG. 9 is a block diagram illustrating the configuration of a correlation processing system in FIG. 8.

Each correlation processing system 11$b(i)$ includes, as illustrated in FIG. 9, a wave detector 111$b(i)$, a correlator (I) 113$b(i)$, a correlator (Q) 115$b(i)$, and an intensity deriver 117$b(i)$.

Descriptions for the wave detector 111$b(i)$ are not given on parts having the same configurations as the wave detector 531$e(i)$ illustrated in FIG. 3. Moreover, the frequency fc(i) of an in-phase signal and a quadrature signal is as described earlier.

The correlator (I) 113$b(i)$ is what is called a matched filter. The correlator (I) 113$b(i)$ first finds a correlation between the wave detection signal (I) outputted from the wave detector 111$b(i)$ and the known code sequence on a code by code basis, and generates N intermediate correlation signals (I) indicating the degrees of correlation for the respective codes. The correlator (I) 113$b(i)$ outputs the N intermediate correlation signals (I) to a corresponding one of the level reduction processors 13$b(i)$, and also, adds the N intermediate correlation signals (I) together into a correlation signal (I) indicating the degree of correlation for the entire code sequence and outputs the correlation signal (I) to the intensity deriver 117$b(i)$.

Figure 10:
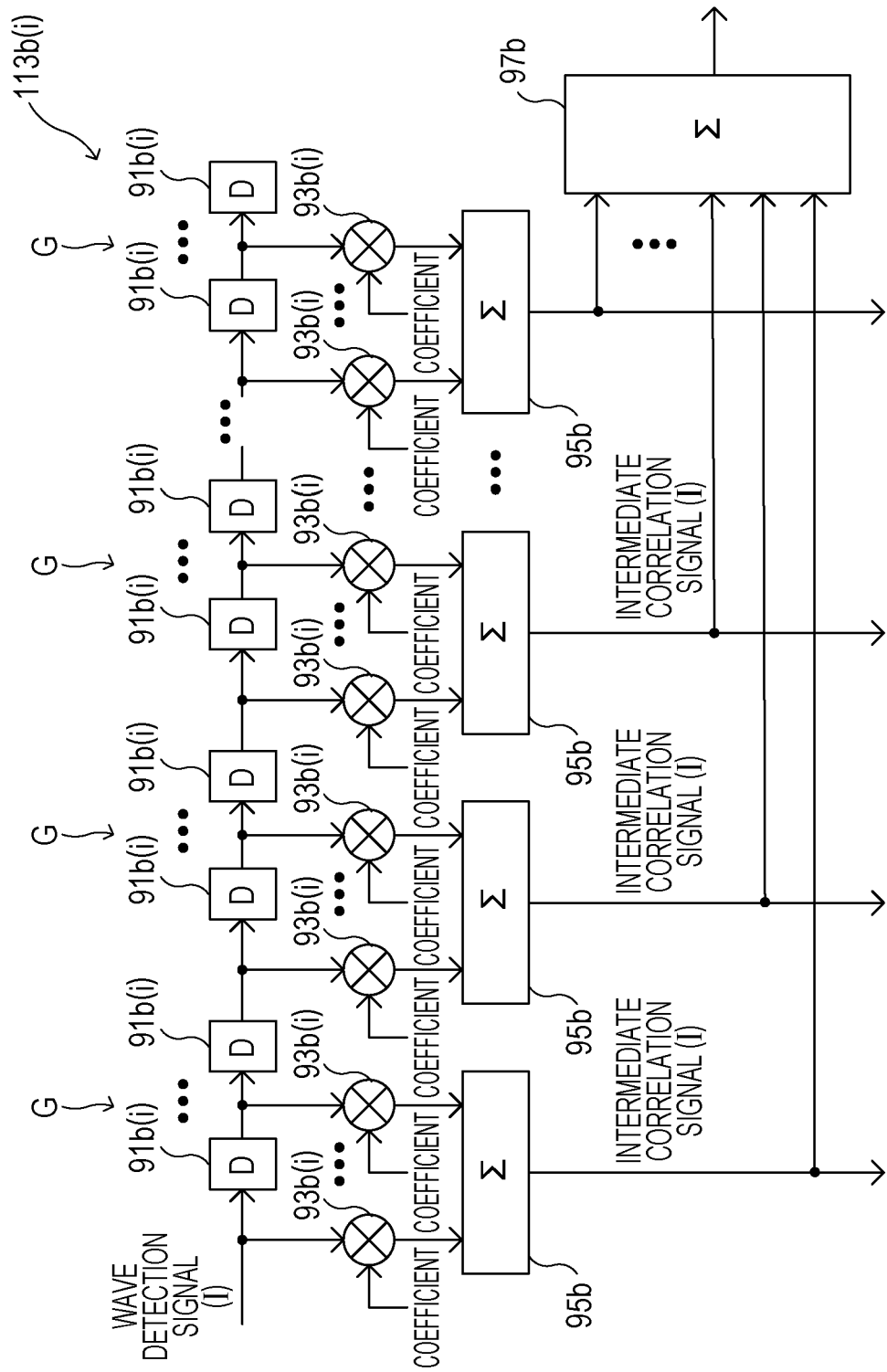
FIG. 10 is a diagram illustrating the configuration of a correlator (I) in FIG. 9.

For the processing described above, each correlator (I) 113$b(i)$ has N tap groups G the number of which is equivalent to the code sequence length as illustrated in FIG. 10. In other words, one code is assigned to each tap group G. Each tap group G includes a plurality of delayers 91$b(i)$, a plurality of multipliers 93$b(i)$, and one adder 95b. In addition to the above, the correlator (I) 113$b(i)$ further includes an adder 97b.

The number of the delayers 91$b(i)$ and the number of the multipliers 93$b(i)$ in each tap group G are determined based on a modulated wave emitted from the transmitter 33e and a sampling rate in the correlator (I) 113$b(i)$. If one code is assigned to each five wavelengths of a modulated wave as illustrated in FIG. 2, the numbers of the delayers 91$b(i)$ and the multipliers 93$b(i)$ are determined based on the number of times the correlator (I) 113$b(i)$ performs sampling within a time required to receive these five wavelengths. The multipliers 93$b(i)$ in each tap group G are assigned corresponding coefficients.

The coefficients used for the respective multipliers 93b(i) are determined as described earlier. Each multiplier 93b(i) operates at predetermined sampling intervals, multiplies a wave detection signal (I) from the preceding delayer 91b(i) by its own coefficient, and outputs the multiplication value.

Each adder 95b adds all the multiplication values from the multipliers 93b(i) in the same tap group G, and outputs the thus-obtained addition value as an intermediate correlation signal (I). Each of the N intermediate correlation signals (I) thus obtained is outputted to the adder 97b and the level reduction processor 13b(i) as the I component of the IQ vector for one code.

The adder 97b adds together the intermediate correlation signals (I) from the respective adders 95b, and outputs the thus-obtained addition value to the intensity deriver 117b(i) as a correlation signal (I).

Each correlator (Q) 115b(i) is also a matched filter. The correlator (Q) 115b(i) first finds a correlation between the wave detection signal (Q) outputted from the wave detector 111b(i) and the known code sequence on a code by code basis, and generates N intermediate correlation signals (Q) as the Q components of the IQ vectors for the respective codes. The correlator (Q) 115b(i) outputs the N intermediate correlation signals (Q) to the level reduction processor 13b(i), and also, adds the N intermediate correlation signals (Q) together into a correlation signal (Q) indicating the degree of correlation for the entire code sequence and outputs the correlation signal (Q) to the intensity deriver 117b(i).

Figure 11:
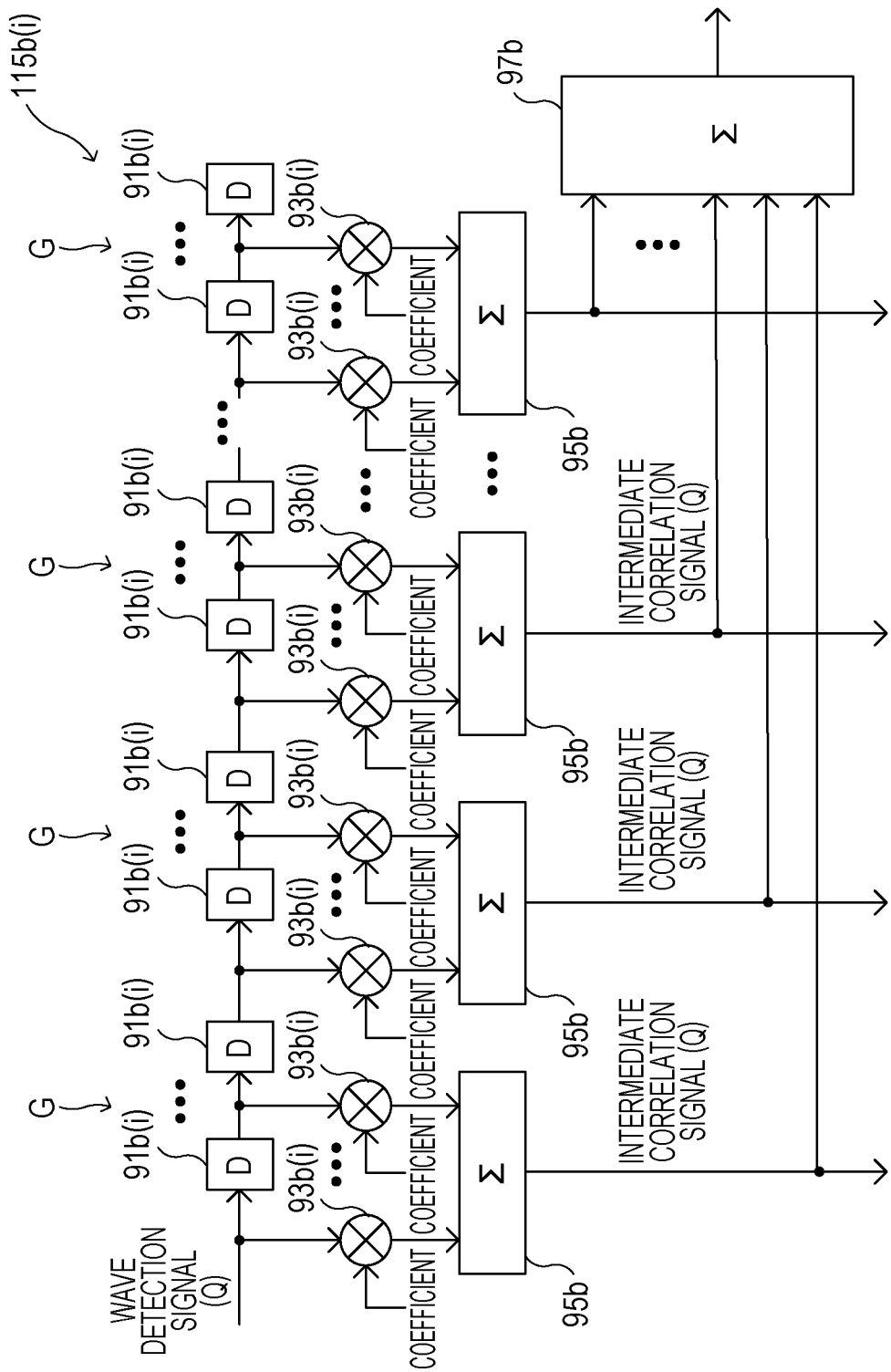
FIG. 11 is a diagram illustrating the configuration of a correlator (Q) in FIG. 9.

Descriptions for the correlator (Q) 115b(i) are not given on parts having the same configurations as the correlator (I) 113b(i), as illustrated in FIG. 11.

At the sampling intervals, the intensity deriver 117b(i) calculates based on both of the correlation signals (I) and (Q) a correlation signal (described earlier) indicating the intensity of a received returned wave, and outputs the correlation signal to the following level reduction processor 13b(i).

5-2. Configuration of and Processing Performed by the Level Reduction Processor 13b(i)

Next, a description is given of the processing performed by the level reduction processor 13b(i).

The level reduction processor 13b(i) receives the I components and the Q components of IQ vectors for the respective codes as N IQ vectors. The following describes how the N IQ vectors behave.

The detection apparatus 1b includes a plurality of correlation processing systems 11b(i) that perform quadrature detection using an in-phase signal and a quadrature signal having a different frequency depending on the moving velocity of the detection target T.

If the carrier frequency of a modulated wave is 50 kHz, the frequency of the returned wave from a target T which is stationary relative to the detection apparatus 1b is still 50 kHz. However, if the target is relatively moving, the frequency of the returned wave is different from 50 kHz due to the Doppler effect.

If the target T is moving toward the detection apparatus 1b at a relative velocity of 5 km/h, the frequency of the returned wave is approximately 50.4 kHz, assuming the speed of sound is 340 m/s.

Thus, the frequency of the in-phase signal and quadrature signal used in the correlation processing systems 11b(i) is determined taking the Doppler effect produced by the relatively moving target T into account.

For example, assume that the correlation processing systems 11b(i) perform quadrature detection using in-phase signals and quadrature signals whose frequencies are shifted from 50 kHz as the center at intervals of 100 Hz. In this case, the correlation processing system 11b(i) for 50 kHz is used for the detection of a target T whose relative velocity is 0 km/h, and the correlation processing system 11b(i) for 50.4 kHz is used for the detection of a target T moving toward the detection apparatus 1b at a relative velocity of 5 km/h.

Each correlator (I) 113b(i) and each correlator (Q) 115b(i) output large correlation peak values properly when the frequency used for the quadrature detection and the frequency of a Doppler-shifted returned wave completely match each other in each correlation processing system 11b(i). However, when there is a difference between those frequencies, the correlation peak value is small.

Further, when there is a difference between the frequency used for the quadrature detection and the frequency of a Doppler-shifted returned wave, it means that phase rotation is caused in the code sequence. Conversely, the frequency difference can be obtained by observation of the amount of phase rotation caused in the code sequence.

Figure 12:
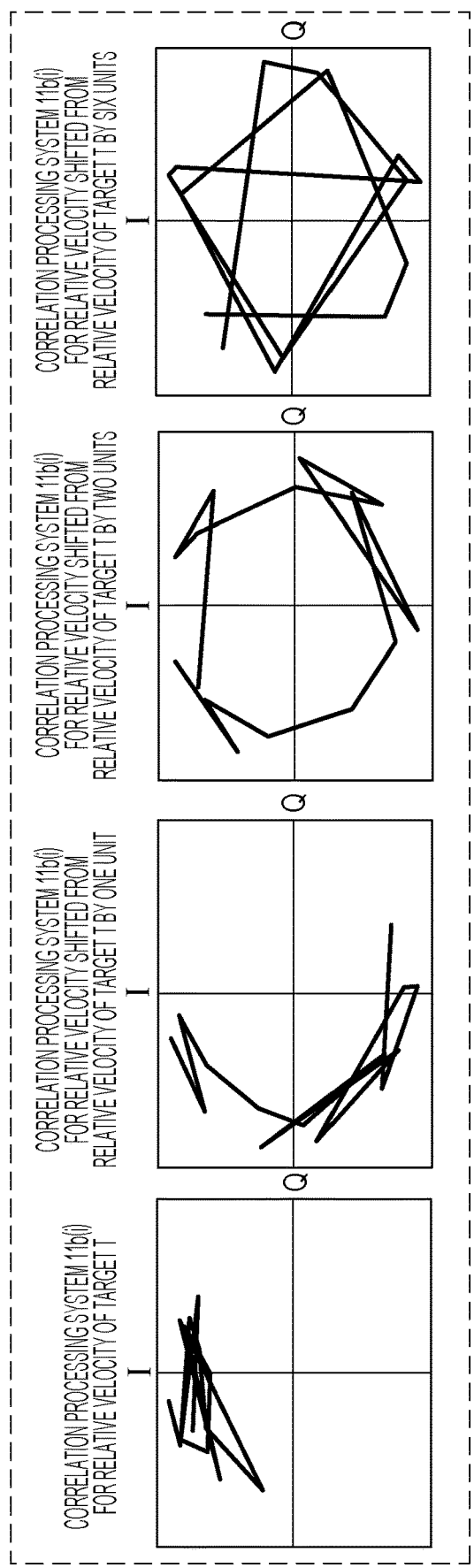
FIG. 12 is a diagram in which N IQ vectors generated by four correlation processing systems" processing a returned wave from a target moving at a certain velocity are plotted on a phase plane.

FIG. 12 is a diagram in which N IQ vectors generated by four correlation processing systems 11b(i) through processing of a returned wave from a target T moving at a given velocity are plotted on a phase plane.

In FIG. 12, the N IQ vectors are sequentially connected on each phase plane where the vertical axis is the I component and the horizontal axis is the Q component.

The first part from the left in FIG. 12 shows N IQ vectors from the correlation processing system 11b(i) for the relative velocity of the target T. This correlation processing system 11b(i) is referred to as a reference correlation processing system 11b(i) hereinbelow. In this case, almost zero Doppler component remains in the returned wave, and thus the N IQ vectors are oriented in almost the same direction.

The second part from the left in FIG. 12 shows N IQ vectors from the correlation processing system 11b(i) for a relative velocity shifted from that of the reference correlation processing system 11b(i) by one unit. In this case, the relative velocity of the target T and the relative velocity assigned to the correlation processing system 11b(i) do not match, so slight rotation of the IQ vectors is observed due to the Doppler component remaining in accordance with the difference between those relative velocities.

The third part from the left in FIG. 12 shows N IQ vectors from the correlation processing system 11b(i) for a relative velocity shifted from that of the reference correlation processing system 11b(i) by two units, and the first one from the right shows N IQ vectors from the correlation processing system 11b(i) for a relative speed shifted from that of the reference correlation processing system 11b(i) by six units.

As shown in FIG. 12, the more the relative velocity assigned to the correlation processing system 11b(i) is different from the relative velocity of the target T, the more the IQ vectors from the correlation processing system 11b(i) rotate on the phase plane.

Thus, a determination as to whether the correlation processing system 11b(i) corresponds to the relative velocity of the target T can be made when the level reduction processor 13b(i) analyzes the distribution and amount of rotation of the N IQ vectors on the phase plane which are generated by the correlation processing system 11b(i).

What the level reduction processor 13b(i) has to determine is whether the N IQ vectors are oriented in substantially the same direction.

First, for the purpose of illustration, N IQ vectors are denoted as IQ vectors Vk, where k is an integer from 1 to N. An IQ vector V1 indicates the degree of correlation of the first code of the code sequence, an IQ vector V2 the degree of correlation of the second code of the code sequence, and so on. An IQ vector VN indicates the degree of correlation of the last code of the code sequence.

Each level reduction processor 13b(i) obtains an angle formed by, for example, the k-th IQ vector and the (k+1)-th IQ vector as an amount of phase variation. The level reduction processor 13b(i) also obtains the ratio of, for example, the k-th IQ vector to the (k+1)-th IQ vector as a variation ratio.

After obtaining the amount of phase variation and the variation ratio for all the combinations of each adjacent two IQ vectors, the level reduction processor 13b(i) obtains their average values.

The level reduction processor 13b(i) outputs a correlation signal from the intensity deriver 117b(i) to the integrator 55e if the average values thus obtained are larger than or equal to predetermined thresholds, or otherwise, outputs the correlation signal to the integrator 55e after masking it.

5-3. Advantageous Effects of the Detection Apparatus 1b

The inclusion of the level reduction processor 13b(i) in the detection apparatus 1b prevents side-lobe components from being sent to the integrator 55e. Thus, the present disclosure can provide the detection apparatus 1b which produces the same advantageous effects as those described in section 4-2.

5-4. First Alternative Example of the Level Reduction Processing

Each level reduction processor 13b(i) may group the N IQ vectors into pairs with no overlapping, and obtain the amount of phase variation and the variation ratio for each of those pairs.

Also in this case, the level reduction processor 13b(i) obtains the average value of all the phase variations and the average value of all the variation ratios.

The level reduction processor 13b(i) outputs the correlation signal from the intensity deriver 117b(i) to the integrator 55e if the average values are larger than or equal to thresholds, or otherwise outputs the correlation signal to the integrator 55e after masking it.

5-5. Second Alternative Example of the Level Reduction Processing

Figure 13:
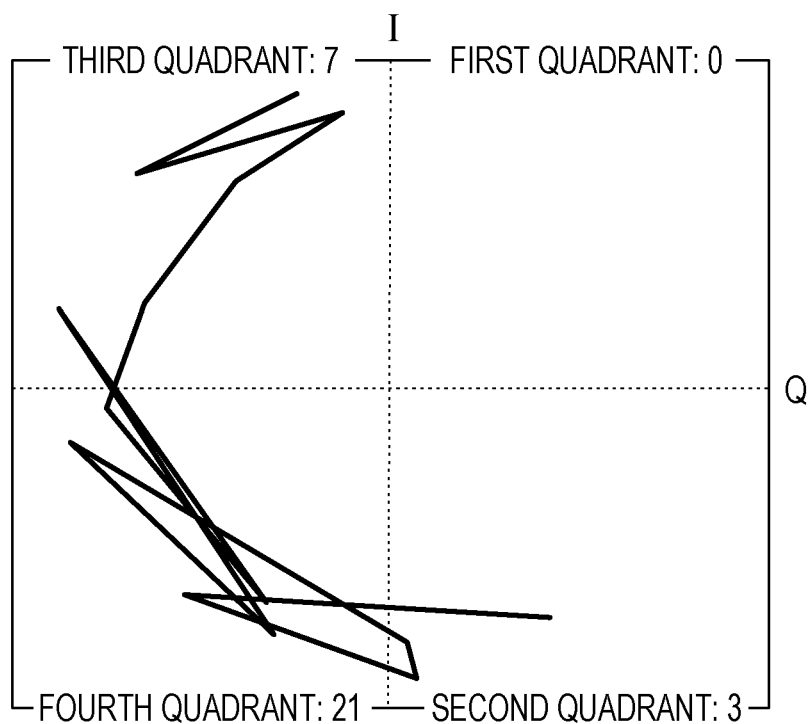
FIG. 13 is a diagram illustrating the distribution of the N IQ vectors over the quadrants on the phase plane.
Figure 14:
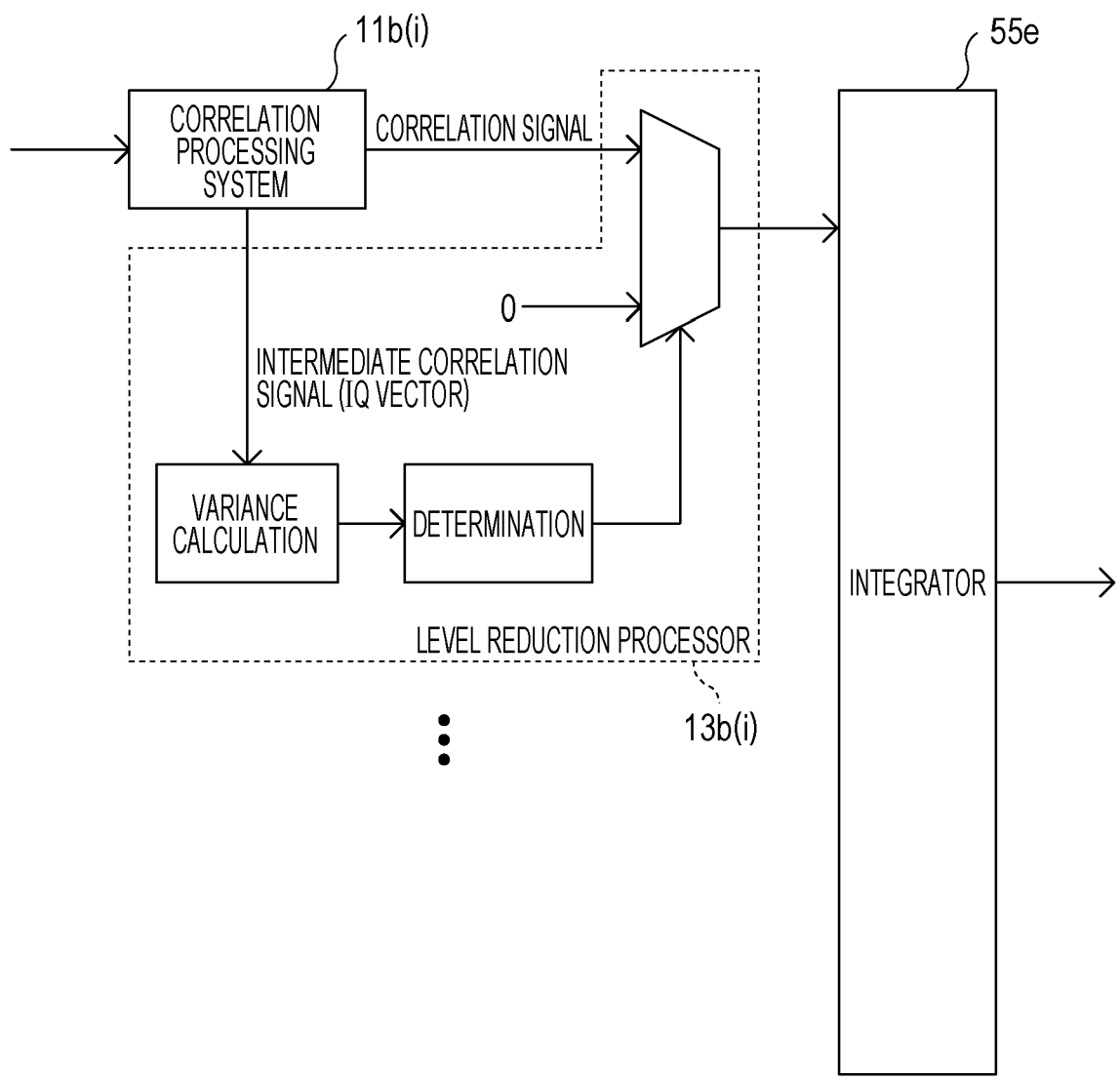
FIG. 14 is a diagram illustrating the configuration of a level reduction processor according to a second alternative example.

With reference to FIGS. 13 and 14, a description is given of a second alternative example of the processing performed by each level reduction processor 13b(i).

As illustrated in FIG. 13, the level reduction processor 13b(i) determines, for each of the N IQ vectors, the quadrant on the phase plane to which the IQ vector belongs. The quadrant of each IQ vector can be determined based on the code of the IQ vector.

When the N IQ vectors have less phase rotation and are oriented in the same direction, they concentrate on any of the four quadrants more. Conversely, when the N IQ vectors have more phase rotation and are oriented in different directions, they are spread over the four quadrants more.

Thus, as illustrated in FIG. 14, the level reduction processor 13b(i) calculates a variance based on the number of IQ vectors in each of the four quadrants.

For instance, assume that out of the total of 31 IQ vectors, 0 IQ vector is included in the first quadrant, 3 in the second quadrant, 7 in the third quadrant, and 21 in the fourth quadrant.

In this case, the level reduction processor 13b(i) obtains a variance using Formula (3) below:

$$\text{Variance} = (\text{the count in the first quadrant} - 31/4)^2 + (\text{the count in the second quadrant} - 31/4)^2 + (\text{the count in the third quadrant} - 31/4)^2 + (\text{the count in the fourth quadrant} - 31/4)^2 = 258.75 \quad (3)$$

Although a variance should include a component of 1/N, it is omitted in the present embodiment.

If the calculated variance is smaller or equal to a variance threshold predetermined by experiment or the like, the level reduction processor 13b(i) determines that the IQ vectors are unevenly distributed and that the received returned wave contains few remaining Doppler components, and outputs the correlation signal from the intensity deriver 117b(i) to the integrator 55e, or otherwise outputs the correlation signal to the integrator 55e after masking it.

5-6. Third Alternative Example of the Level Reduction Processing

There may be a case where spike noise is superimposed on the determination result obtained by the level reduction processor 13b(i) of the second alternative example. If due to the influence of the spike noise the level reduction processor 13b(i) erroneously sends a correlation signal which should really be masked to the integrator 55e without masking it, the target T detection accuracy of the detection apparatus 1b may be lowered.

Figure 15:
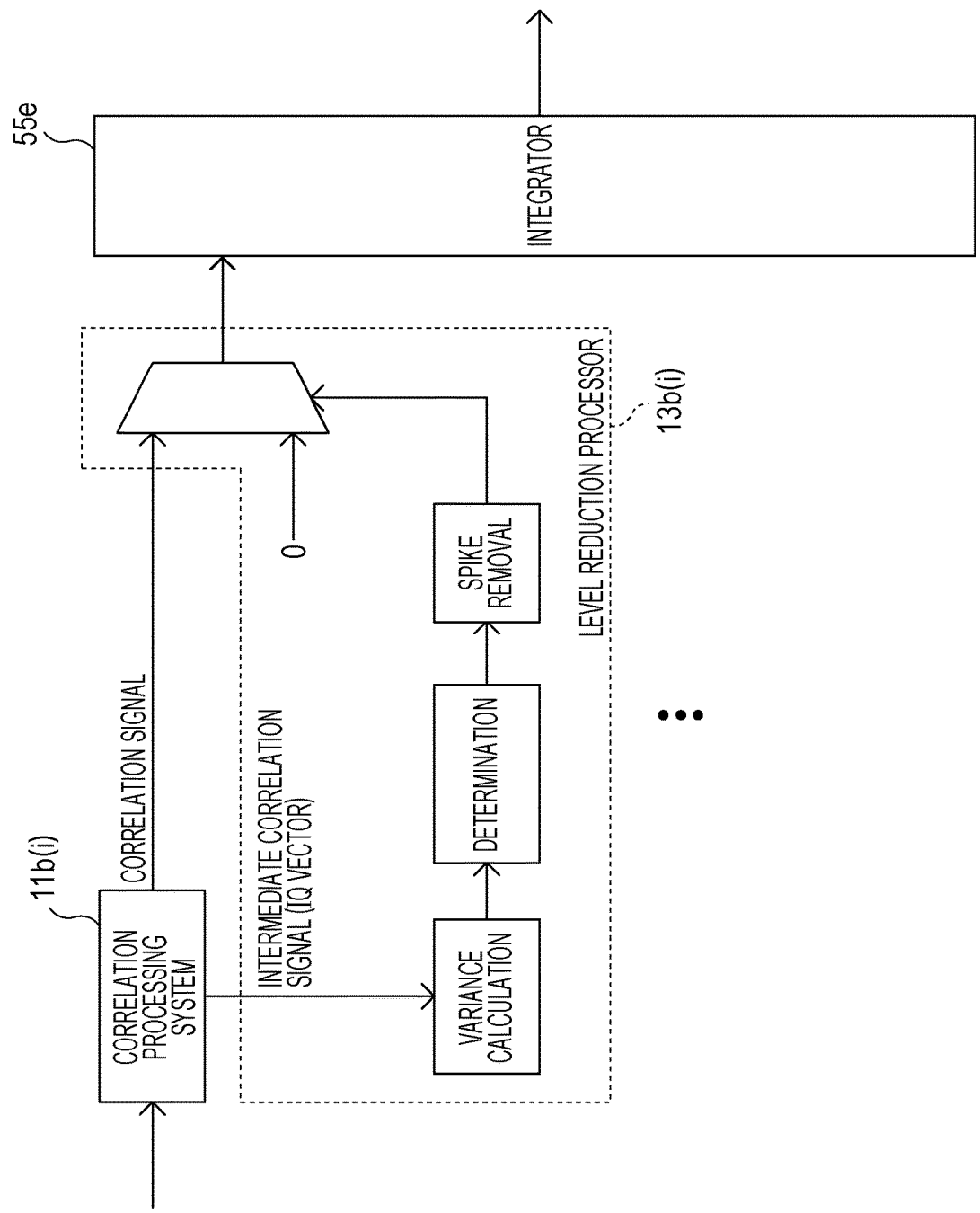
FIG. 15 is a diagram illustrating the configuration of a level reduction processor according to a third alternative example.

Taking such a possibility into account, each level reduction processor 13b(i) may perform, as illustrated in FIG. 15, spike removal processing after the variance is compared with its threshold.

Figure 16:
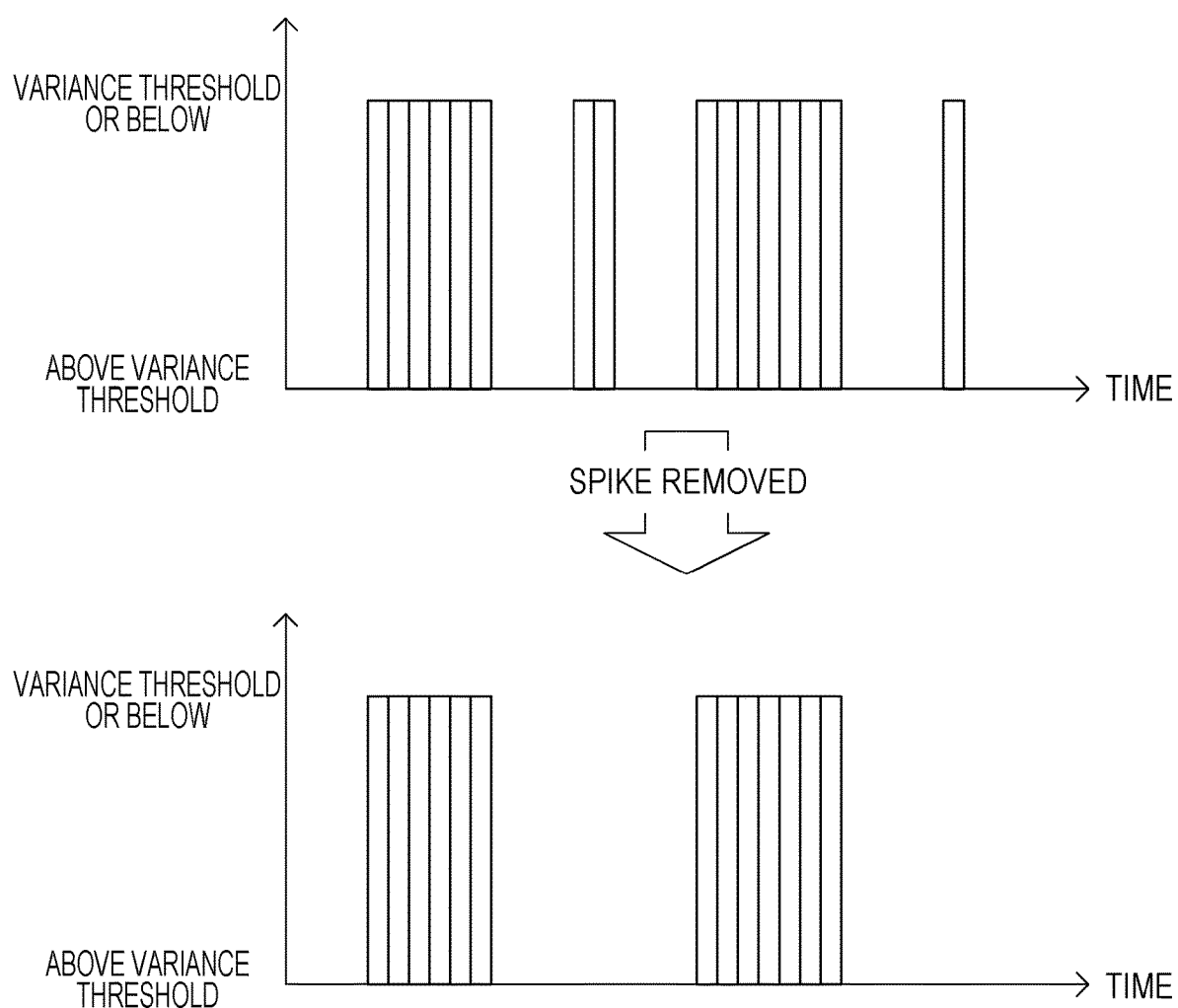
FIG. 16 is a schematic diagram illustrating the processing performed by the level reduction processor in FIG. 15.

For example, the duration of time in which spike noise occurs is equal to or longer than a sampling interval but sufficiently shorter than the duration of time in which correlation peak occurs. Each level reduction processor 13b(i) retains the determination results obtained using the variance threshold for the past predetermined number of sampling periods, and as illustrated in FIG. 16 as an example, if the length of time in which the result of determination is smaller than or equal to the variance threshold is equal to or shorter than a predetermined time threshold, determines that spike noise is superimposed on the determination result. Then, the level reduction processor 13b(i) changes the determination result to exceeding the threshold, thereby removing the spike noise. Note that the predetermined time threshold is obtained by experiment or simulation in the development stage of the detection apparatus 1b, and is set to the length of two sampling periods in the example of FIG. 16.

5-7. Fourth Alternative Example of the Level Reduction Processing

In order for the level reduction processor 13b(i) of the second alternative example to evaluate the phase rotation of the IQ vectors more accurately, the N IQ vectors obtained from the correlation processing system 11b(i) need to be sufficiently larger than noise level.

Figure 17:
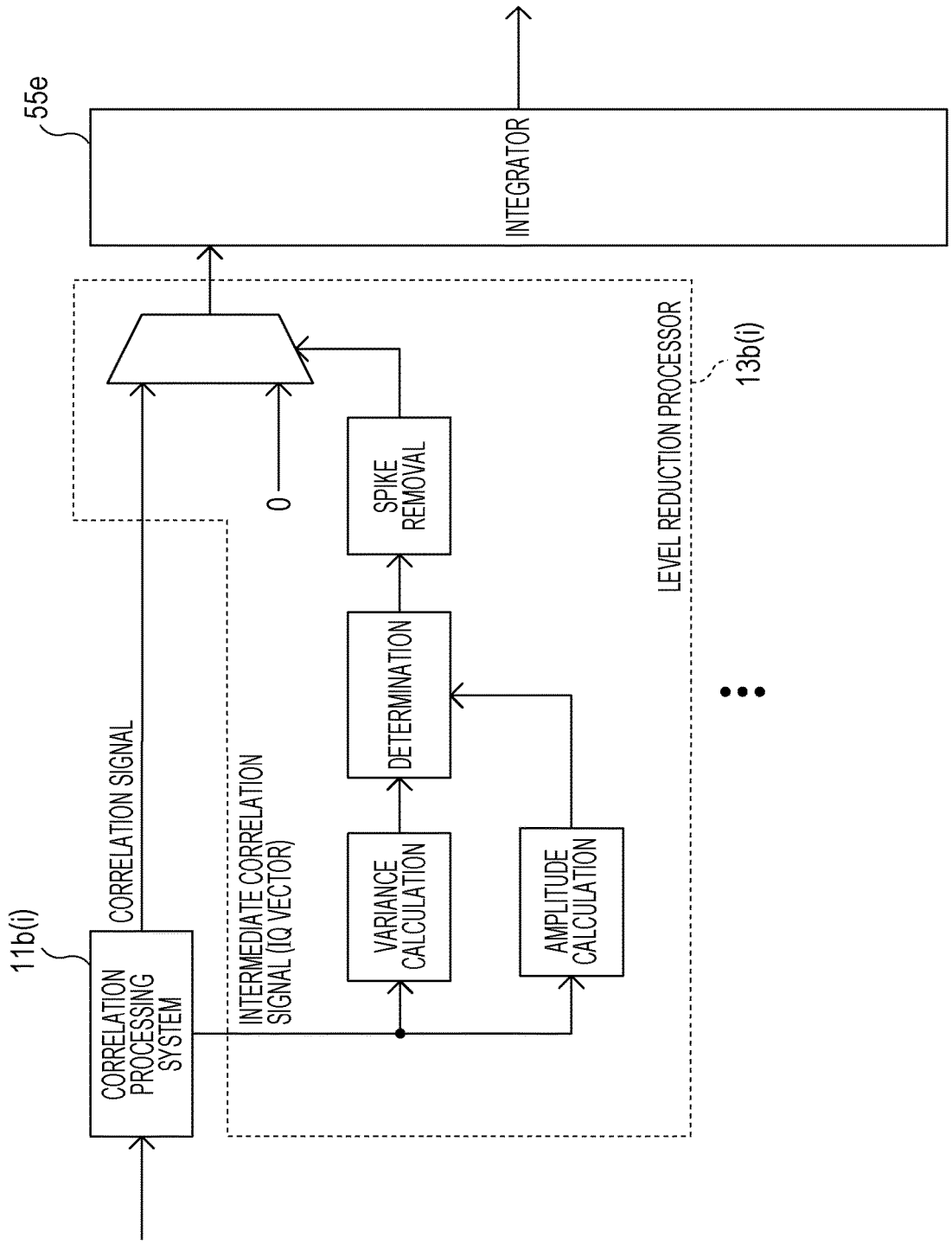
FIG. 17 is a diagram illustrating the configuration of a level reduction processor according to a fourth alternative example.

Thus, as illustrated in FIG. 17, each level reduction processor 13$b(i)$ calculates the size of each of the N IQ vectors and determines for each IQ vector whether the IQ vector is equal to or larger than a predetermined size threshold. If the sizes of the N IQ vectors are smaller than the size threshold, the level reduction processor 13$b(i)$ does not make the determination of whether the variance of the N IQ vectors is equal to or larger than the variance threshold. In this case, the level reduction processor 13$b(i)$ outputs the correlation signal from the preceding correlation processing system 11$b(i)$ to the integrator 55$e$.

Instead of comparing the size of each of the N IQ vectors with the size threshold, the average value, the center value, the maximum value, or the minimum value of the N IQ vectors may be used as a representative value and compared with the size threshold.

5.8. Fifth Alternative Example of the Level Reduction Processing

Figure 18:
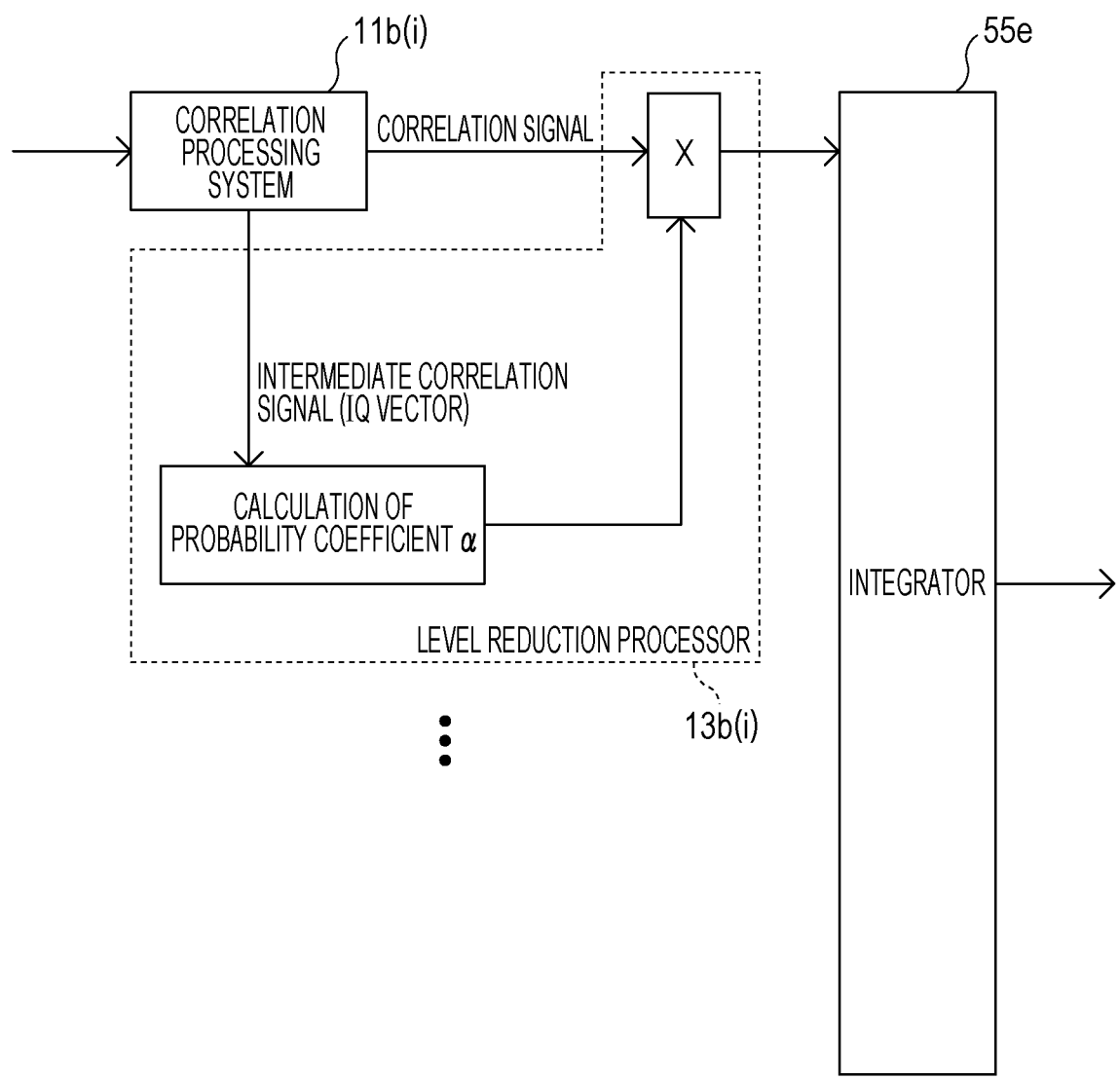
FIG. 18 is a diagram illustrating the configuration of a level reduction processor according to a fifth alternative example.

FIG. 18 illustrates level reduction processing according to a fifth alternative example. Each level reduction processor 13$b(i)$ uses Formula (4) below to calculate a probability coefficient $\alpha$ of the N IQ vectors outputted from the correlation processing system. Then, the level reduction processor 13$b(i)$ multiples the correlation signal by the probability coefficient $\alpha$. In other words, the correlation level is reduced for a correlation signal whose probability coefficient $\alpha$ is small. The probability coefficient $\alpha$ calculated based on Formula (4) is a numerical value from 0 to 1. The probability coefficient $\alpha$ is a value close to 1 when the N vectors are oriented in the same direction, and is a value close to 0 when the N vectors are not oriented in the same direction. By the multiplication of the correlation value level of each system by the probability coefficient $\alpha$, the level for the system with a low probability can be reduced. Note that in Formula (4), the larger the probability coefficient $\alpha$, the higher the likelihood.

$$\alpha(r, fd) = \frac{\left|\sum_{n=1}^{N} COROUT_n(r, fd)\right|2}{N \sum_{n=1}^{N} |COROUT_n(r, fd)|2} )K \quad (4)$$

$$0 \leq \alpha(r, fd) \leq 1$$

6. Third Embodiment

Next, the detection apparatus 1$c$ according to a third embodiment is described with reference to FIGS. 19 to 22.

6-1. Configuration of and Processing Performed by the Detection Apparatus 1$c$ The detection apparatus 1$c$ in FIG. 19 differs from the detection apparatus 1$a$ in FIG. 6 in including a reception device 5$c$ in place of the reception device 5$a$.

The reception device 5$c$ differs from the reception device 5$a$ described earlier in including p sets of one correlation processing system 11$c(r)$ and q level reduction processors 13$c(rs)$ in place of the m pairs of the correlation processing system 53$e(i)$ and the level reduction processor 11$a(i)$.

In the above, p is an integer greater than or equal to 1, r is an integer from 1 to p, q is an integer greater than or equal to 2, and s is an integer from 1 to q.

In the present embodiment, components equivalent to those in the first embodiment are denoted by the same reference numerals and are not described again below.

The code sequence length N is 15 in the present embodiment.

Figure 20:
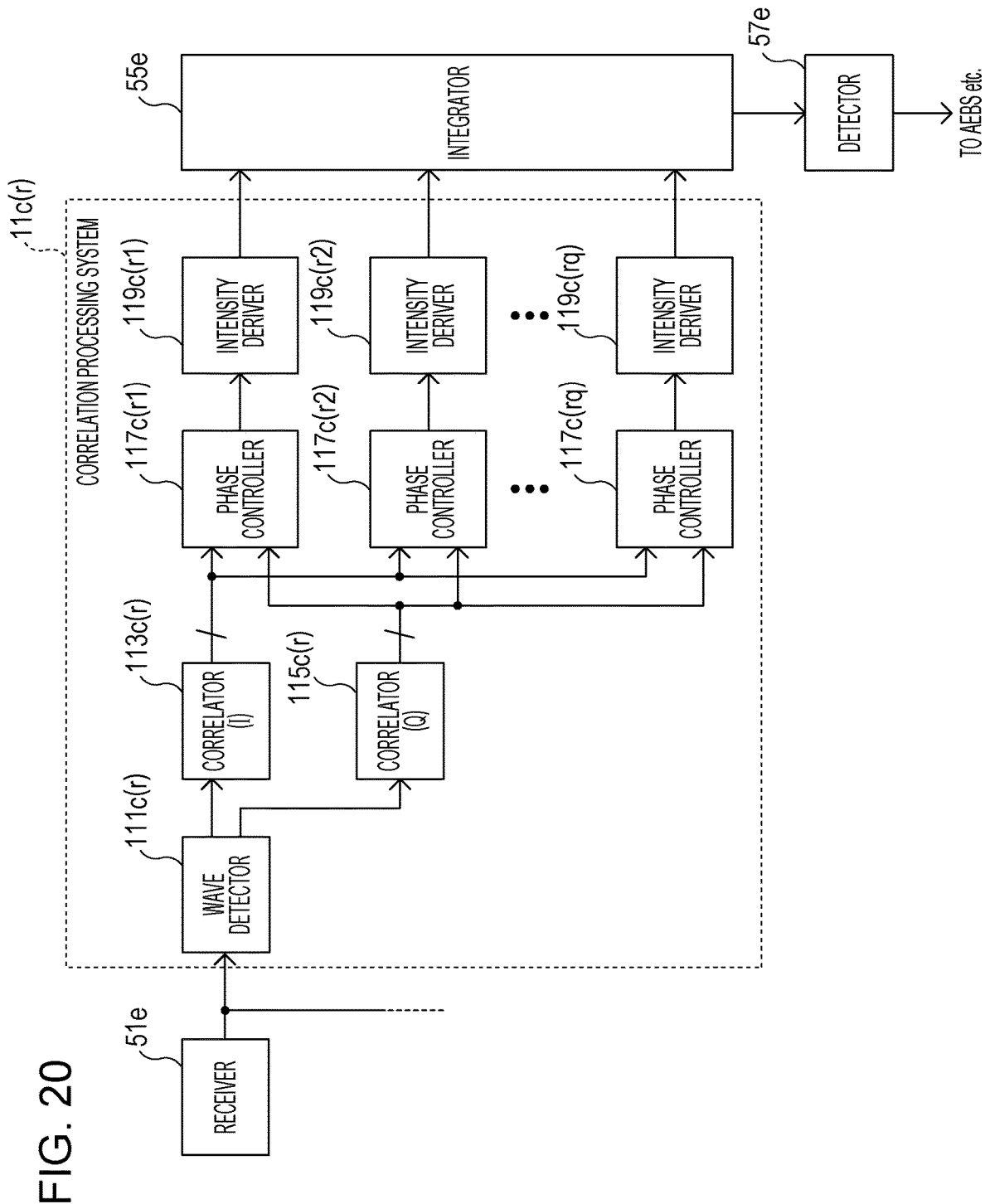
FIG. 20 is a block diagram illustrating the configuration of a correlation processing system in FIG. 19.

Each correlation processing system 11$c(r)$ includes, as illustrated in FIG. 20, one wave detector 111$c(r)$, one correlator (I) 113$c(r)$, one correlator (Q) 115$c(r)$, q phase controllers 117$c(rs)$, and q intensity derivers 119$c(rs)$.

The wave detector 111$c(r)$ receives a wave outputted from the receiver 51$e$, and like the wave detector 531$e(i)$ illustrated in FIG. 3, performs quadrature detection on the input wave using an in-phase signal and a quadrature signal having a frequency fc($r$).

The frequency fc($r$) is, like the frequency fc($i$), different for each wave detector 111$c(r)$, and determined according to the relative velocity of the detection target T with respect to the detection apparatus 1$c$.

Each wave detector 111$c(r)$ removes high-frequency components from the wave detection signals (I) and (Q) obtained by the quadrature detection. The resultant wave detection signal (I) and wave detection signal (Q) are outputted to the correlator (I) 113$c(r)$ and the correlator (Q) 115$c(r)$, respectively.

Next, the configurations of the correlator (I) 113$c(r)$ and the correlator (Q) 115$c(r)$ are described.

As illustrated in the upper part of FIG. 21, the correlator (I) 113$c(r)$ has the same number of tap groups G as the number of codes in the code sequence length N. In other words, each tap group G is assigned to one code. Each tap group G includes a plurality of delayers 91$c(r)$, a plurality of multipliers 93$c(r)$, and one adder 95$c(r)$.

The numbers of delayers 91$c(r)$ and multipliers 93$c(r)$ are determined in the same manner as the numbers of delayers 91$b(i)$ and multipliers 93$b(i)$ (see the second embodiment).

The coefficients used for the respective multipliers 93$c(r)$ are determined in the same manner as those used for the multipliers 93$b(i)$.

At predetermined sampling intervals, each multiplier 93$c(r)$ multiplies a wave detection signal (I) inputted from the preceding delayer 91$c(r)$ by its own coefficient, and outputs the multiplication value.

The adder 95$c(r)$ adds all the multiplication values from the multipliers 93$c(r)$ in the same tap group G, and outputs the thus-obtained value to a corresponding one of the following phase controllers 117$c$(r1) to 117$c(rq)$.

By performing the above-described processing in each of the tap groups G which are as many as the codes in the code sequence length N, the correlator (I) 113$c(r)$ of the present embodiment performs processing for finding a correlation between the input wave detection signal (I) and the known code sequence for each code forming the known code sequence. As a result, the addition values outputted from the adders 95$c(r)$ are intermediate correlation signals (I) which are as many as the codes in the code sequence length N.

Descriptions of the correlator (Q) 115$c(r)$ illustrated in the lower part of FIG. 21 are not given on parts having the same configuration as the correlator (I) 113$c(r)$.

Since the code sequence length N is 15, the correlator (I) 113$c(r)$ outputs a total of 15 addition values (or intermediate correlation signals) (I), and the correlator (Q) 115$c(r)$ also outputs a total of 15 addition values (intermediate correlation signals) (Q). For the purpose of illustration, the addition values are named as shown in Table 2 below.

TABLE 2

Names of addition values outputted from the adders 95c(r)

| Correlator (I) 113c(r) | | Correlator (Q) 115c(r) | |
|---|---|---|---|
| Position of adder 95c(r) relative to the input end | Name | Position of adder 95c(r) relative to the input end | Name |
| Closest | COR_OUTI_15 | Closest | COR_OUTQ_15 |
| 2nd-closest | COR_OUTI_14 | 2nd-closest | COR_OUTQ_14 |
| 3rd-closest | COR_OUTI_13 | 3rd-closest | COR_OUTQ_13 |
| 4th-closest | COR_OUTI_12 | 4th-closest | COR_OUTQ_12 |
| 5th-closest | COR_OUTI_11 | 5th-closest | COR_OUTQ_11 |
| 6th-closest | COR_OUTI_10 | 6th-closest | COR_OUTQ_10 |
| 7th-closest | COR_OUTI_09 | 7th-closest | COR_OUTQ_09 |
| 8th-closest | COR_OUTI_08 | 8th-closest | COR_OUTQ_08 |
| 9th-closest | COR_OUTI_07 | 9th-closest | COR_OUTQ_07 |
| 10th-closest | COR_OUTI_06 | 10th-closest | COR_OUTQ_06 |
| 11th closest | COR_OUTI_05 | 11th closest | COR_OUTQ_05 |
| 12th-closest | COR_OUTI_04 | 12th-closest | COR_OUTQ_04 |
| 13th-closest | COR_OUTI_03 | 13th-closest | COR_OUTQ_03 |
| 14th-closest | COR_OUTI_02 | 14th-closest | COR_OUTQ_02 |
| 15th-closest | COR_OUTI_01 | 15th-closest | COR_OUTQ_01 |

In Table 2 above, for instance, the name of an addition value outputted from the adder $95c(r)$ closest to the input end of the correlator (I) $113c(r)$ is COR_OUTI_15, and the name of an addition value outputted from the adder $95c(r)$ farthest from the input end of the correlator (Q) $115c(r)$ is COR_OUTQ_01.

Figure 22:
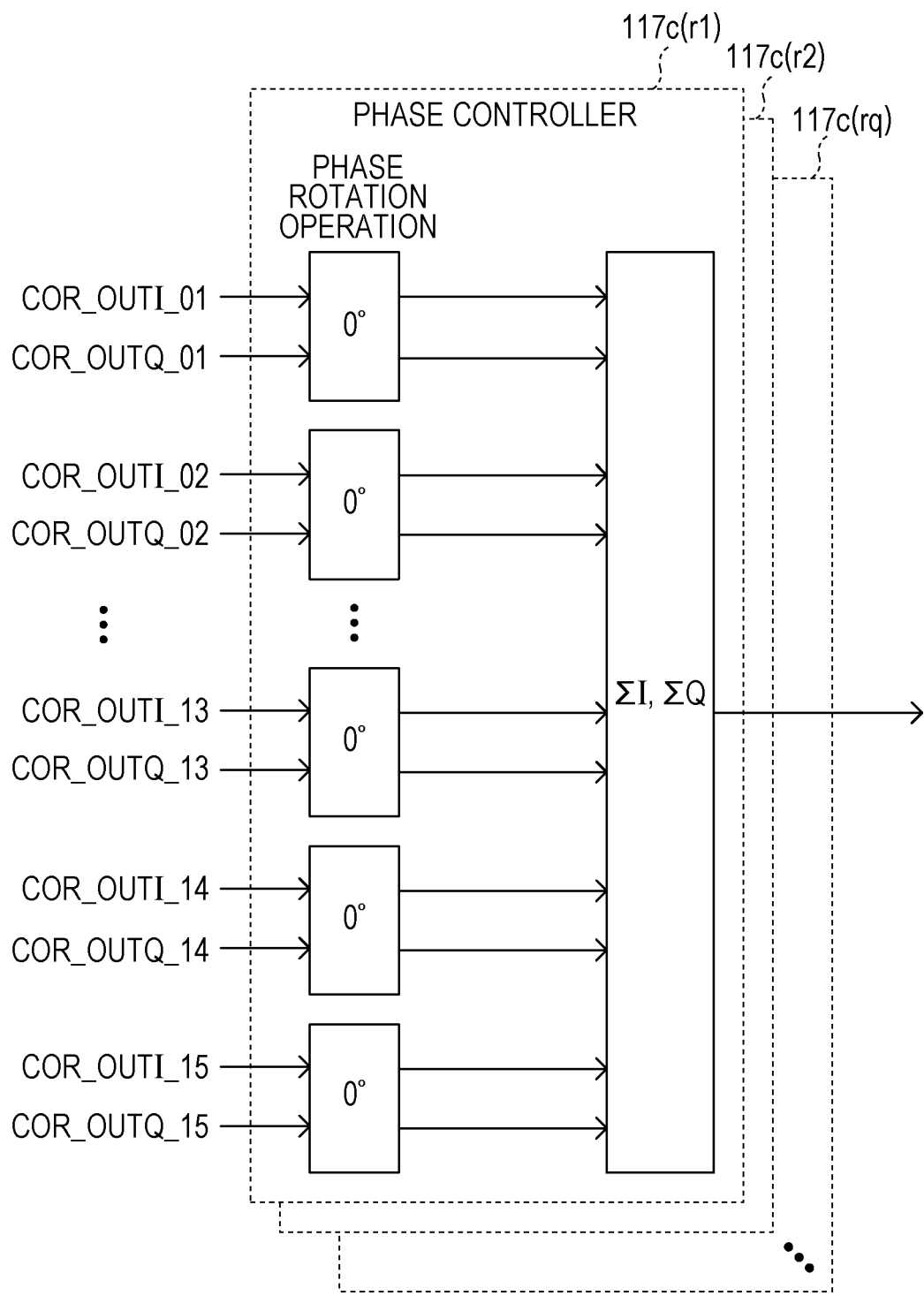
FIG. 22 is a diagram illustrating processing performed by phase controllers in FIG. 21.

Referring back to FIG. 20, the q phase controllers 117c(rs) receive the respective addition values from the correlator (I) $113c(r)$ and the respective addition values from the correlator (Q) $115c(r)$. As illustrated in FIG. 22, each phase controller 117c(rs) performs phase rotation operation for each code in the code sequence. By each phase rotation operation, one of the addition values from the correlator (I) $113c(r)$ for a certain code is subjected to phase rotation operation of a predetermined pattern, and one of the addition values from the correlator (Q) $115c(r)$ of the same ordinal number as the certain code in the code sequence is subjected to phase rotation operation of a predetermined pattern.

In FIG. 22, the phase controller 117c(r1) performs phase rotation operation of 0° on the output addition values COR_OUTI_01 and COR_OUTQ_01, and also performs phase rotation operation of 0° on the output addition values COR_OUTI_02 and COR_OUTQ_02. FIG. 22 illustrates an example where the same rotation operation is performed on the rest of the output additional values.

The following describes the phase rotation operation.

First, the q phase controllers 117c(rs) are assigned different moving velocities v(r1) to v(rq) of the target T. One of the moving velocities v(r1) to v(rq) is a moving velocity represented by the frequency fc(r), with the rest being different from the moving velocity represented by the frequency fc(r). Note that the moving velocities v(r1) to v(rq) are different from one another and are determined appropriately with the one represented by the frequency fc(r) being the center.

The amount of Doppler shift in a returned wave differs depending on the moving velocity of the target T. Due to such an amount of Doppler shift, phase rotation occurs in the code sequence superimposed on the returned wave, and the amount of the phase rotation depends on the moving velocity of the target T. Thus, in the development stage of the detection apparatus 1c, experiment or simulation is performed to derive beforehand how much phase rotation may be caused in each code of the code sequence depending on the moving velocity of the target T.

Further, to compensate for phase rotation which may be caused in each code, each phase controller 117c(rs) performs phase rotation operation on the addition values outputted from the correlator (I) $113c(r)$ and the correlator (Q) $115c(r)$.

With reference to an example illustrated in Table 3 below, a description is given of amounts of phase rotation operated by the phase controllers 117c(rs). Note that Table 3 below illustrates a case where q=9.

TABLE 3

Amounts of Phase Rotation Operated by the Phase Controller 117c(r1) to 117c (r9)

| | v(r1) | v(r2) | v(r3) | v(r4) | v(r5) | v(r6) | v(r7) | v(r8) | v(r9) |
|---|---|---|---|---|---|---|---|---|---|
| 1st code | 0° | 0° | 180° | 0° | 0° | 0° | 180° | 0° | −90° |
| 2nd code | 0° | 0° | 180° | 0° | 0° | 0° | 90° | 0° | −90° |
| 3rd code | 0° | 0° | 180° | 0° | 0° | 0° | 90° | 0° | −90° |
| 4th code | 0° | 0° | 180° | 0° | −90° | 0° | 90° | 0° | 180° |
| 5th code | 0° | 0° | 180° | 0° | −90° | 0° | 90° | 90° | 180° |
| 6th code | 0° | 0° | 180° | 0° | −90° | 90° | 90° | 90° | 180° |
| 7th code | 0° | 0° | 180° | 0° | −90° | 90° | 0° | 90° | 180° |
| 8th code | 0° | 0° | 90° | 90° | −90° | 90° | 0° | 90° | 90° |
| 9th code | 0° | 0° | 90° | 90° | −90° | 90° | 0° | 180° | 90° |
| 10th code | 0° | 0° | 90° | 90° | −90° | 90° | 0° | 180° | 90° |
| 11th code | 0° | 0° | 90° | 90° | 180° | 180° | 0° | 180° | 90° |
| 12th code | 0° | 0° | 90° | 90° | 180° | 180° | −90° | 180° | 0° |
| 13th code | 0° | 90° | 90° | 90° | 180° | 180° | −90° | −90° | 0° |
| 14th code | 0° | 90° | 90° | 90° | 180° | 180° | −90° | −90° | 0° |

According to Table 3 above, for the moving velocity v(r1), phase rotation operation of 0° is performed on all the output addition values COR_OUTI_01 to COR_OUTI_15 and COR_OUTQ_01 to COR_OUTQ_15.

Further, for the moving velocity v(r2), phase rotation operation of 0° is performed on the output addition values COR_OUTI_01 to COR_OUTI_12 and COR_OUTQ_01 to COR_OUTQ_12, and phase rotation operation of 90° is performed on the output addition values COR_OUTI_13 to COR_OUTI_15 and COR_OUTQ_13 to COR_OUTQ_15.

Similarly, for the rest of the moving velocities, namely the moving velocities v(r3) to v(r9), phase rotation operation of the angle shown in table 3 above is performed on each of the output addition values COR_OUTI_01 to COR_OUTI_15 and COR_OUTQ_01 to COR_OUTQ_15.

In the example in Table 3, each code is assigned phase rotation amounts such that phase rotation is performed at 90° intervals approximately. The content of Table 3 above is however a mere example of a mode for implementing the phase rotation described above.

Next, with reference to Table 4 below, a description is given of phase rotation operation for each phase rotation amount described in Table 3 above.

TABLE 4

Phase Rotation Operation for Each Rotation Amount

| | Phase Rotation Amount | | | |
|---|---|---|---|---|
| | 0° | 90° | 180° | −90° |
| I_OUT | I_IN | −Q_IN | −I_IN | Q_IN |
| Q_OUT | Q_IN | I_IN | −Q_IN | −I_IN |

In Table 4 above, I_IN is any one of the output addition values COR_OUTI_01 to COR_OUTI_15, and Q_IN is any one of the output addition values COR_OUTQ_01 to COR_OUTQ_15. Additionally, I_OUT is one of the output addition values COR_OUTI_01 to COR_OUTI_15 which has already been subjected to corresponding phase rotation operation, and Q_OUT is one of the output addition values COR_OUTQ_01 to COR_OUTQ_15 which has already been subjected to corresponding phase rotation operation.

For the phase rotation amount of 0°, I_IN and Q_IN are outputted respectively as the phase rotation-operated outputs I_OUT and Q_OUT. As to the rest of the phase rotation amounts, phase rotation operation is performed as illustrated in Table 4 above.

Next, phase rotation operation is described.

Reference is made to the phase rotation amount for the moving velocity v(r8) in Table 3 above. For this moving velocity, the phase rotation amount for the 1st code to the 4th code is 0° in Table 3. According to Table 4 above, the phase rotation-operated outputs I_OUT and Q_OUT for the phase rotation amount of 0° are I_IN and Q_IN, respectively.

Further, the phase rotation amount for the 5th code to the 8th code is 90° in Table 3. The phase rotation-operated outputs I_OUT and Q_OUT for the phase rotation amount of 90° are −I_IN and −Q_IN, respectively.

Further, the phase rotation amount for the 9th code to the 12th code is 180° in Table 3. The phase rotation-manipulated outputs I_OUT and Q_OUT for the phase rotation amount of 180° are −Q_IN and I_IN, respectively.

Further, the phase rotation amount for the 13th code to the 15th code is) −90° (270° in Table 3. The phase rotation-manipulated outputs I_OUT and Q_OUT for the phase rotation amount of −90° are Q_IN and −I_IN, respectively.

As illustrated in FIG. 22, each phase controller $117c(rs)$ generates an addition value(I) by adding the phase rotation-operated addition values COR_OUTI_01 to COR_OUTI_15 together, and generates an addition value (Q) by adding the phase rotation-operated addition values COR_OUTQ_01 to COR_OUTQ_15 together.

The above describes the phase rotation amounts for the moving velocity v(r8). Phase rotation operation is similarly performed on each code for the rest of the moving velocities v(rs).

The above phase rotation operation approximately rotates the phases of signals inputted to the phase controller $117c(rs)$ (namely, addition values COR_OUTI_01 to COR_OUTI_15 and COR_OUTQ_01 to COR_OUTQ_15) by a predetermined amount for a particular frequency component. The frequency component is determined by factors such as the phase rotation amount to be applied to the input signal, the number of taps assigned to one code, and sampling rate.

For instance, assume that the phase controller $117c(r8)$ applies phase rotation of an amount corresponding to xHz to an input signal. In this case, an addition value outputted from the phase controller $117c(r8)$ is equivalent to a correlation signal which is obtained by detecting an input wave using an in-phase signal having a frequency which is a sum of the carrier frequency fc(i) and xHz and finding a correlation between this detection result and the known code sequence and is then outputted.

Thus, the q phase controllers $117c(rs)$'s adding input signals together after applying phase rotation to the input signals by amounts corresponding to frequencies difference from one another is substantially equivalent to detecting an input wave using in-phase signals of q frequencies and finding a correlation between the detection result and the known code sequence.

Referring back to FIG. 20, each of the q phase controllers $117c(rs)$ outputs a pair of output addition values (I) and (Q) to the following intensity deriver $119c(rs)$. Based on both of the output addition values (I) and (Q), each intensity deriver $119c(rs)$ calculates an absolute value in a quadrature space as a correlation signal indicating the signal intensity of the input wave, and outputs the correlation signal to the following level reduction processor $13c(rs)$.

In the detection apparatus $1c$ configured as above, one of the (p×q) phase controllers $117c(11)$ to $117c(pq)$ which matches the moving velocity of the target T outputs a correlation signal having a relatively large correlation peak as a main-lobe component, whereas the rest output correlation signals having relatively small correlation peaks as side-lobe components.

Figure 19:
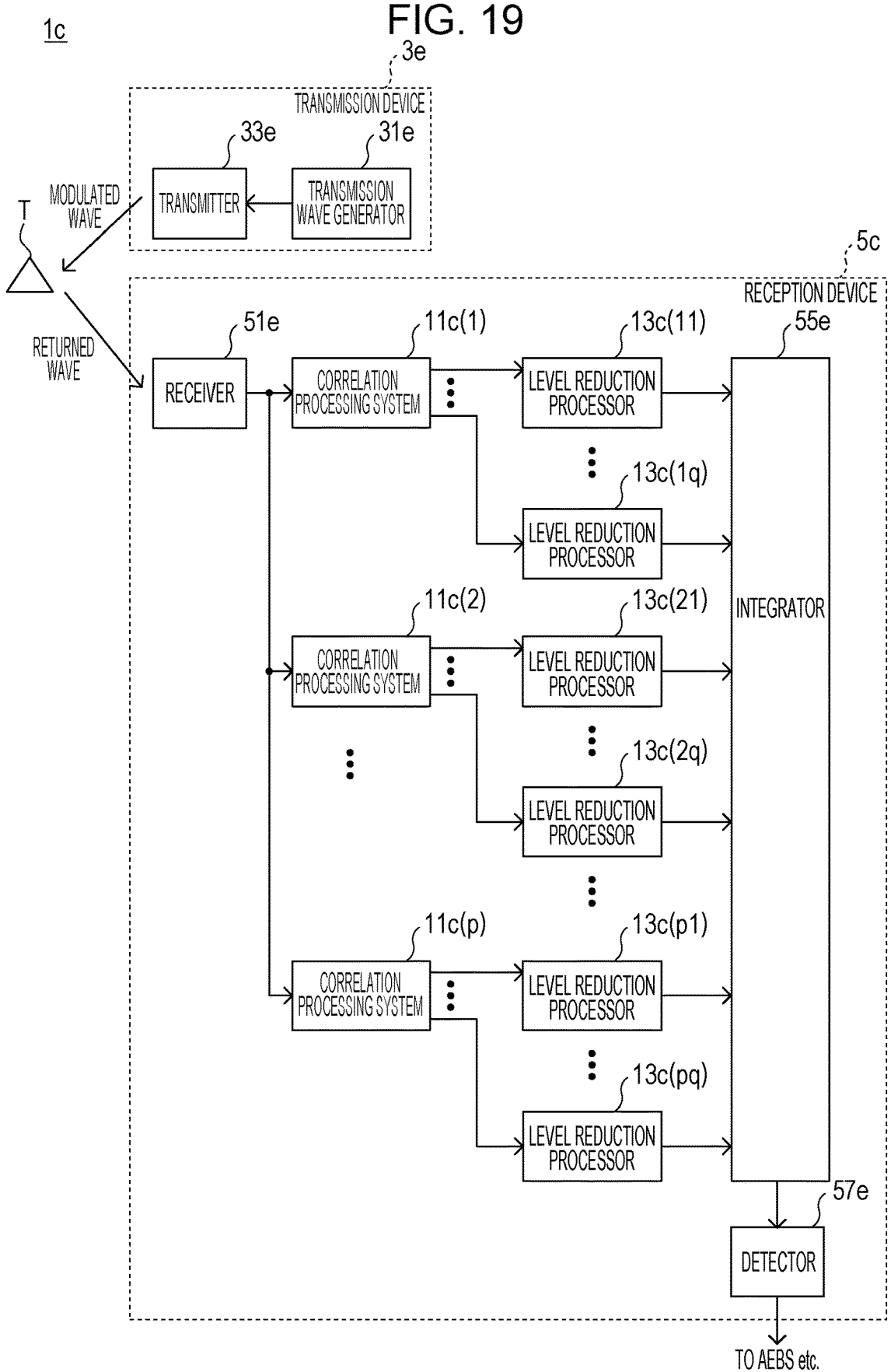
FIG. 19 is a block diagram illustrating the configuration of a detection apparatus according to a third embodiment of the present disclosure.

For example, the level reduction processors $13c(rs)$ (namely (p×q) level reduction processors $13c(11)$ to $13c(pq)$ subject correlation signals from the preceding phase controllers $117c(rs)$ to processing similar to that performed by the level reduction processors $11a(i)$ described in the first embodiment, and output the results to the integrator $55e$ (see FIG. 19). Thus, a main-lobe component is outputted to the integrator $55e$, while a side-lobe component is outputted to the integrator $55e$ after level reduction.

6-2. Advantageous Effects Produced by the Detection Apparatus $1c$

By having the level reduction processors $13c(i)$ in the stage following the correlation processing systems $11c(i)$ described above, the detection apparatus $1c$ prevents side-lobe components form being sent to the integrator $55e$. Thus, it is possible to provide the detection apparatus $1c$ which can produce advantageous effects similar to those described in section 4-2.

The present disclosure can be realized by software, hardware, or software in cooperation with hardware.

Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on the degree of integration.

However, the technique of implementing an integrated circuit is not limited to the LSI and may be realized by using a dedicated circuit, a general-purpose processor, or a special-purpose processor. In addition, a field programmable gate array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The detection apparatus, the detection method, and the detection program according to the present disclosure is capable of detecting a target at higher accuracy, and is applicable to a vehicular sonar and the like.

What is claimed is:

1. A detection apparatus that detects a target present in a vicinity, comprising:

a plurality of correlation processing systems, wherein each of the plurality of correlation processing systems operates according to a corresponding one of a plurality of different frequencies, and wherein each of the plurality of correlation processing systems, in operation, determines a correlation between a predetermined code sequence used for generating a phase-modulated input wave and one of a plurality of detected signals obtained by detecting the phase-modulated input wave at the corresponding one of the plurality of different frequencies, and generates a correlation signal for the corresponding one of the plurality of different frequencies;

a plurality of level reduction processors respectively corresponding to the plurality of correlation processing systems, wherein each of the plurality of level reduction processors, in operation, processes the correlation signal from a corresponding one of the plurality of correlation processing systems and reduces a level of the correlation signal for the corresponding one of the plurality of different frequencies when the correlation signal for the corresponding one of the plurality of different frequencies is determined to indicate a side lobe component at a frequency different from a carrier frequency of the phase-modulated input wave and does not reduce the level of the correlation signal for the corresponding one of the plurality of different frequencies when the correlation signal for the corresponding one of the plurality of different frequencies is determined to indicate a main lobe component at a same frequency as the carrier frequency of the phase-modulated input wave; and a detector which, in operation, detects at least a presence or an absence of a target based on the correlation signal for the corresponding one of the plurality of different frequencies processed by each of the plurality of level reduction processors.

2. The detection apparatus according to claim 1, wherein each of the level reduction processors reduces the level of the correlation signal received from a corresponding one of the correlation processing systems when the level of the received correlation signal is below a predetermined threshold.

3. The detection apparatus according to claim 1, wherein each of the level reduction processors reduces the level of the correlation signal received from a corresponding one of the correlation processing systems when a duration of time in which a correlation value between a temporal change in the level of the received correlation signal and a change pattern of a main-lobe component exceeds a predetermined threshold is longer than a reference value.

4. The detection apparatus according to claim 1, wherein each of the correlation processing systems includes:
a wave detector that generates a wave detection signal (I) and a wave detection signal (Q) by performing quadrature detection on the phase-modulated input wave using the corresponding one of the plurality of different frequencies,
a correlator (I) that determines a correlation between the wave detection signal (I) and the code sequence for each of codes forming the code sequence and generates a plurality of intermediate correlation signals (I) the number of which is equivalent to a code sequence length which is a length of the code sequence,
a correlator (Q) that determines a correlation between the wave detection signal (Q) and the code sequence for each of codes forming the code sequence and generates a plurality of intermediate correlation signals (Q) the number of which is equivalent to the code sequence length which is the length of the code sequence, and
an intensity deriver that generates the correlation signal based on an addition value of the plurality of intermediate correlation signals (I) and an addition value of the plurality of intermediate correlation signals (Q), and each of the level reduction processors reduces the level of the correlation signal received from the corresponding correlation processing system based on a distribution of the intermediate correlation signals (I) and the intermediate correlation signals (Q) on a phase plane.

5. The detection apparatus according to claim 4, wherein each of the level reduction processors reduces the level of the correlation signal received from the corresponding correlation processing system based on a variance of the intermediate correlation signals (I) and the intermediate correlation signals (Q) on the phase plane.

6. The detection apparatus according to claim 1, wherein each of the correlation processing systems in operation, determines a correlation between the predetermined code sequence used for generating the phase-modulated input wave and one of the plurality of detected signals obtained by detecting, for each of a plurality of codes forming the code sequence, the phase-modulated input wave at the corresponding one of the plurality of different frequencies, and generates a plurality of intermediate correlation signals, a number of the plurality of intermediate correlation signals being equivalent to a code sequence length which is a length of the code sequence, rotates phases of the plurality of intermediate correlation signals, generates an addition value by adding the phase-rotated signals according to the number of the plurality of intermediate correlation signals which is equivalent to the code sequence length, and generates the correlation signal for the corresponding one of the plurality of different frequencies indicating a signal intensity of the input wave.

7. A detection method for detecting a target present in a vicinity, comprising:
for each of a plurality of different frequencies, finding a correlation between a predetermined code sequence used for generating a phase-modulated input wave and one of a plurality of detection signals obtained by detecting the phase-modulated input wave at one of the plurality of different frequencies, and generating one of a plurality of correlation signals;
processing the plurality of correlation signals generated by the generating, wherein the processing includes reducing a level of each of the correlation signals determined to indicate a side lobe component at a frequency different from a carrier frequency of the phase-modulated input wave and not reducing a level of each of the correlation signals determined to indicate a main lobe component at a same frequency as the carrier frequency of the phase-modulated input wave; and
detecting at least a presence or an absence of a target based on the plurality of correlation signals processed by the processing.

8. A non-transitory computer-readable medium storing a detection program that, when executed by a computer, causes the computer to:

for each of a plurality of different frequencies, find a correlation between a predetermined code sequence used for generating a phase-modulated input wave and one of a plurality of detection signals obtained by detecting the phase-modulated input wave at one of the plurality of different frequencies, and generate one of a plurality of correlation signals;

process the plurality of correlation signals generated, by reducing a level of each of the correlation signals determined to indicate a side lobe component at a frequency different from a carrier frequency of the phase-modulated input wave and not a reducing level of each of the correlation signals determined to indicate a main lobe component at a same frequency as the carrier frequency of the phase-modulated input wave; and detect at least a presence or an absence of a target based on the plurality of correlation signals processed.

\* \* \* \* \*